United States Patent
Park et al.

(10) Patent No.: US 12,462,775 B2
(45) Date of Patent: Nov. 4, 2025

(54) TRANSMITTER CIRCUIT AND DISPLAY DEVICE INCLUDING THE SAME

(71) Applicant: SAMSUNG ELECTRONICS CO., LTD., Suwon-si (KR)

(72) Inventors: Yong-Yun Park, Suwon-si (KR); Alankyongho Kim, Suwon-si (KR); Hyunwook Lim, Suwon-si (KR); Yongil Kwon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 293 days.

(21) Appl. No.: 18/199,163

(22) Filed: May 18, 2023

(65) Prior Publication Data
US 2024/0112650 A1   Apr. 4, 2024

(30) Foreign Application Priority Data
Sep. 30, 2022   (KR) .......................... 10-2022-0125220

(51) Int. Cl.
G09G 5/39 (2006.01)
(52) U.S. Cl.
CPC ....... *G09G 5/39* (2013.01); *G09G 2300/0452* (2013.01); *G09G 2310/0297* (2013.01); *G09G 2340/16* (2013.01); *G09G 2356/00* (2013.01)
(58) Field of Classification Search
CPC ............. G09G 5/39; G09G 2300/0452; G09G 2310/0297; G09G 2340/16; G09G 2356/00
See application file for complete search history.

(56) References Cited

U.S. PATENT DOCUMENTS

| | | | |
|---|---|---|---|
| 7,260,223 B2 * | 8/2007 | Inoue | H04L 9/0662 375/295 |
| 7,580,525 B1 * | 8/2009 | Ejima | H04L 25/03866 380/268 |
| 9,210,010 B2 | 12/2015 | Whitby-Strevens | |
| 10,170,033 B2 | 1/2019 | Yoo et al. | |
| 10,565,928 B2 | 2/2020 | Li et al. | |
| 10,741,144 B2 | 8/2020 | Kim et al. | |
| 12,294,391 B2 * | 5/2025 | Unuma | G06F 11/08 |
| 2014/0101356 A1 * | 4/2014 | Sonoda | G06F 13/4027 710/313 |

(Continued)

FOREIGN PATENT DOCUMENTS

JP   2002-221953 A   8/2002

*Primary Examiner* — Henry Tsai
*Assistant Examiner* — Harry Z Wang
(74) *Attorney, Agent, or Firm* — Sughrue Mion, PLLC

(57) ABSTRACT

The present disclosure provides transmitter circuits and display devices including the same. In some embodiments, the transmitter circuit includes a run length detector, a modifier, and a scrambler. The run length detector is configured to derive position information indicating a first input data related to a threshold run length from among a plurality of input data in a predetermined bit unit, when a run length of first scrambled data for the first input data meets or exceeds the threshold run length in the predetermined bit unit. The modifier is configured to generate modified input data by inverting at least one bit of the first input data based on the position information. The scrambler is configured to receive the modified input data from the modifier, and generate second scrambled data by scrambling the modified input data with scrambling information.

20 Claims, 16 Drawing Sheets

(56) References Cited

U.S. PATENT DOCUMENTS

| | | |
|---|---|---|
| 2014/0192097 A1 | 7/2014 | Baek et al. |
| 2019/0207744 A1* | 7/2019 | Reinhardt ............... H04L 12/40 |
| 2022/0014469 A1* | 1/2022 | Ota ..................... H04L 47/12 |
| 2022/0044652 A1 | 2/2022 | Jeong et al. |

* cited by examiner

Gdm1[0:9]
| 1 | 1 | 1 | 0 | 0 | 0 | 1 | 1 | 1 | 0 |

Bdm2[0:9]
| 0 | 1 | 0 | 0 | 1 | 0 | 1 | 1 | 0 | 0 |

FIG. 9

| | | | | | | | | | | |
|---|---|---|---|---|---|---|---|---|---|---|
|#1|NS[23]|S[14]|S[15]|S[16]|S[17]|S[18]|S[19]|S[20]|S[21]|S[22]|S[23]|
|#2|NS[22]|NS[23]|S[14]|S[15]|S[16]|S[17]|S[18]|S[19]|S[20]|S[21]|S[22]|
|#3|NS[21]|NS[22]|NS[23]|S[14]|S[15]|S[16]|S[17]|S[18]|S[19]|S[20]|S[21]|
|#4|NS[20]|NS[21]|NS[22]|NS[23]|S[14]|S[15]|S[16]|S[17]|S[18]|S[19]|S[20]|
|#5|NS[19]|NS[20]|NS[21]|NS[22]|NS[23]|S[14]|S[15]|S[16]|S[17]|S[18]|S[19]|
|#6|NS[18]|NS[19]|NS[20]|NS[21]|NS[22]|NS[23]|S[14]|S[15]|S[16]|S[17]|S[18]|
|#7|NS[17]|NS[18]|NS[19]|NS[20]|NS[21]|NS[22]|NS[23]|S[14]|S[15]|S[16]|S[17]|
|#8|NS[16]|NS[17]|NS[18]|NS[19]|NS[20]|NS[21]|NS[22]|NS[23]|S[14]|S[15]|S[16]|
|#9|NS[15]|NS[16]|NS[17]|NS[18]|NS[19]|NS[20]|NS[21]|NS[22]|NS[23]|S[14]|S[15]|
|#10|NS[14]|NS[15]|NS[16]|NS[17]|NS[18]|NS[19]|NS[20]|NS[21]|NS[22]|NS[23]|S[14]|

FIG. 10

| S[14] | S[15] | S[16] | S[17] | S[18] | S[19] | S[20] | S[21] | S[22] | S[23] |
|---|---|---|---|---|---|---|---|---|---|
| 0 | 0 | 0 | 0 | 0 | 0 | 0 | 0 | 1 | 0 |

↑

| S[14] | S[15] | S[16] | S[17] | S[18] | S[19] | S[20] | S[21] | S[22] | S[23] |
|---|---|---|---|---|---|---|---|---|---|
| 1 | 0 | 1 | 0 | 1 | 0 | 1 | 0 | 1 | 0 |

FIG. 11

| NS[14] | NS[15] | NS[16] | NS[17] | NS[18] | NS[19] | NS[20] | NS[21] | NS[22] | NS[23] |
|---|---|---|---|---|---|---|---|---|---|
| 1 | 0 | 0 | 0 | 1 | 0 | 1 | 0 | 0 | 0 |

↑

| NS[14] | NS[15] | NS[16] | NS[17] | NS[18] | NS[19] | NS[20] | NS[21] | NS[22] | NS[23] |
|---|---|---|---|---|---|---|---|---|---|
| 1 | 0 | 1 | 0 | 1 | 0 | 1 | 0 | 1 | 0 |

…

TRANSMITTER CIRCUIT AND DISPLAY DEVICE INCLUDING THE SAME

CROSS-REFERENCE TO RELATED APPLICATION

This application claims benefit of priority 35 U.S.C. § 119 to Korean Patent Application No. 10-2022-0125220, filed on Sep. 30, 2022, in the Korean Intellectual Property Office, the disclosure of which is incorporated by reference herein by in its entirety.

BACKGROUND

1. Field

The present disclosure relates generally to data processing devices, and more particularly, to a transmitter circuit and a display device including the same.

2. Description of Related Art

In related data processing devices, overhead may be added to data transmitted through a channel between a transmitter and a receiver in order to stabilize clock data recovery (CDR) in a unified standard interface for TV (USI-T) clock embedded interface, and/or to maintain a maximum run length. A run length may indicate a data period in which data is maintained constant without toggling. As such, a related transmitter may insert overhead (e.g., bits) into data in order to prevent the run length of data from exceeding the maximum run length.

For example, one (1) overhead bit may be added for every nine (9) data bits, which may result in an overhead to data ratio of approximately 11.11%. For another example, six (6) bits of transition catalyst data (TCD) may be added for every 180 data bits, which may result in an overhead to data ratio of approximately 3.33%. For another example, a 10-bit header may be added for every 510 data bits, which may result in an overhead to data ratio of approximately 1.96%.

The above information disclosed in this Background section is only for enhancement of understanding of the background of the present disclosure, and therefore it may contain information that does not form the prior art that is already known to a person of ordinary skill in the art.

SUMMARY

Aspects of the present disclosure provide a transmitter circuit capable of minimizing an overhead occurring in data to be transmitted, and a display device including the same.

According to an aspect of the present disclosure, a transmitter circuit is provided. The transmitter circuit includes a run length detector, a modifier, and a scrambler. The run length detector is configured to derive position information indicating a first input data related to a threshold run length from among a plurality of input data in a predetermined bit unit, when a run length of first scrambled data for the first input data meets or exceeds the threshold run length in the predetermined bit unit. The modifier is configured to generate modified input data by inverting at least one bit of the first input data based on the position information. The scrambler is configured to receive the modified input data from the modifier, and generate second scrambled data by scrambling the modified input data with scrambling information.

According to an aspect of the present disclosure, a display device is provided. The display device includes a display panel including a plurality of pixels and a plurality of data lines coupled to the plurality of pixels, a source driver configured to supply a plurality of data signals to the plurality of data lines based on image data signals, and a transmitter circuit configured to generate modified pixel data by inverting at least one bit of target pixel data corresponding to first scrambled data when a run length of the first scrambled data meets or exceeds a threshold run length. The first scrambled data has been obtained by scrambling pixel data indicating a gray scale. The transmitter circuit is further configured to generate second scrambled data by scrambling the modified pixel data, and compensate for pixel data corresponding to a target sub-pixel to be compensated for that is adjacent to a sub-pixel corresponding to the target pixel data by offsetting a change in the target pixel data. The target sub-pixel to be compensated for has a same color as the sub-pixel corresponding to the target pixel data. The image data signals include the second scrambled data.

According to an aspect of the present disclosure, a display device is provided. The display device includes a display panel including a plurality of pixels and a plurality of data lines coupled to the plurality of pixels, a source driver configured to supply a plurality of data signals to the plurality of data lines based on image data signals, and a transmitter circuit configured to generate modified pixel data by inverting at least one bit of target pixel data corresponding to first scrambled data when a run length of the first scrambled data meets or exceeds a threshold run length. The first scrambled data has been obtained by scrambling pixel data indicating a gray scale. The transmitter circuit is further configured to generate second scrambled data by scrambling the modified pixel data, and compensate for next pixel data corresponding to the target pixel data among a plurality of next pixel data in a next frame following a frame to which the target pixel data belongs by offsetting a change in the target pixel data.

Additional aspects will be set forth in part in the description which follows and, in part, will be apparent from the description, or may be learned by practice of the presented embodiments.

BRIEF DESCRIPTION OF DRAWINGS

The above and other aspects, features, and advantages of certain embodiments of the present disclosure will be more apparent from the following description taken in conjunction with the accompanying drawings, in which:

FIG. 9 is a view schematically showing a method in which a comparator compares scrambling information, according to an embodiment;

FIG. 10 is a view showing a method in which the LFSR modification circuit modifies the scrambling information, according to an embodiment;

FIG. 11 is a view showing another method in which the LFSR modification circuit modifies the scrambling information, according to an embodiment;

DETAILED DESCRIPTION

Figure 1:
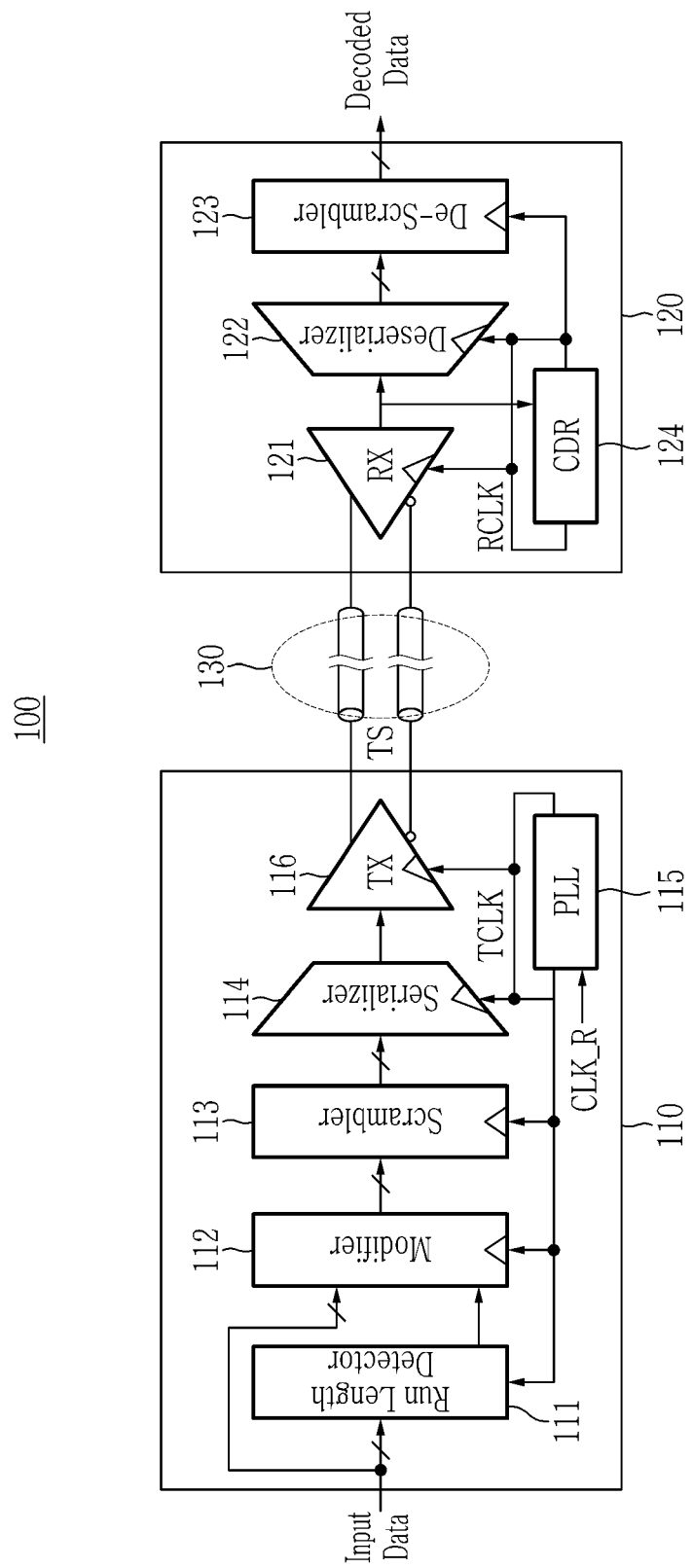
FIG. 1 is an example diagram of an interface circuit, according to an embodiment.

Hereinafter, embodiments of the present disclosure are described in detail with reference to the accompanying drawings so that those skilled in the art to which the present disclosure pertains may easily practice the present disclosure.

However, the present disclosure may be implemented in various different forms and is not limited to the embodiments described herein.

In addition, in the drawings, portions unrelated to the description will be omitted to clearly describe the present disclosure, and similar portions will be denoted by similar reference numerals throughout the present disclosure.

In a flowchart described with reference to the drawings, an order of operations may be changed, several operations may be merged with each other, a certain operation may be divided, and a certain operation may not be performed.

In addition, a term of a singular number may be interpreted as the singular number or its plural number unless explicitly expressed such as "one" or "single."

Terms including ordinal numbers such as "first," "second," and the like may be used to describe various components. However, these components are not limited by these terms. These terms may be used to differentiate one component from other components. For example, as used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wired), wirelessly, or via a third element. Furthermore, as used herein, each of such phrases as "A or B," "at least one of A and B," "at least one of A or B," "A, B, or C," "at least one of A, B, and C," and "at least one of A, B, or C," may include any possible combinations of the items enumerated together in a corresponding one of the phrases.

Reference throughout the present disclosure to "one embodiment," "an embodiment," "an example embodiment," or similar language may indicate that a particular feature, structure, or characteristic described in connection with the indicated embodiment is included in at least one embodiment of the present solution. Thus, the phrases "in one embodiment", "in an embodiment," "in an example embodiment," and similar language throughout this disclosure may, but do not necessarily, all refer to the same embodiment.

FIG. 1 is an example diagram of an interface circuit, according to an embodiment.

Referring to FIG. 1, an interface circuit 100 may include a transmitter circuit 110, a receiver circuit 120, and a transmission channel 130. In an embodiment, the interface circuit 100 may include an interface circuit used for input and/or output of image source data for displaying an image and/or pixel data to be written to a display pixel. The transmitter circuit 110 may transmit data to the receiver circuit 120 through the transmission channel 130. As shown in FIG. 1, the transmission channel 130 may include, by way of example, two signal lines for transmitting a differential signal pair. However, the present disclosure is not limited in this regard. For example, the transmission channel 130 may contain more or fewer signal lines for transmitting data between the transmitter circuit 110 and the receiver circuit 120.

The transmitter circuit 110 may include a run length detector 111, a modifier 112, a scrambler 113, a serializer 114, a phase locked loop (PLL) circuit 115, and a transmitter TX 116.

The PLL circuit 115 may receive a reference clock signal CLK_R and generate a transmission clock signal TCLK for controlling an operation of the transmitter circuit 110 by using the reference clock signal CLK_R. For example, the PLL circuit 115 may generate the transmission clock signal TCLK corresponding to an integer (e.g., an integer greater than or equal to 1) multiple of the reference clock signal CLK_R. In an embodiment, the run length detector 111, the modifier 112, the scrambler 113, the serializer 114, and the transmitter TX 116 may operate in synchronization with the transmission clock signal TCLK.

The run length detector 111 may monitor input data to detect whether a run length of scrambled data generated from the input data meets or exceeds a threshold run length in a predetermined bit unit. Alternatively or additionally, the run length detector 111 may derive position information of the input data related to the threshold run length when the run length of the scrambled data meets or exceeds the threshold run length. In an embodiment, the run length detector 111 may include the scrambler 113 to monitor the run length of the scrambled data. The input data related to the threshold run length may indicate at least one input data corresponding to at least one scrambled data having (e.g., meeting or exceeding) the threshold run length. The position information of the input data may indicate a position of the corresponding input data among consecutively positioned input data. In an embodiment, the threshold run length may be greater than the allowable maximum run length by at least one (1) bit. For example, the threshold run length may be 11 bits when the allowable maximum run length is 10 bits.

The modifier 112 may receive the input data and generate modified input data by inverting at least one specific bit of the input data indicated by the position information derived by the run length detector 111. The modifier 112 may transmit the modified input data to the scrambler 113. Alternatively or additionally, the modifier 112 may bypass the inverting operation and transmit the (unmodified) input data having a run length within the maximum run length to the scrambler 113. In an embodiment, the modifier 112 may generate modified input data by inverting a least significant bit (LSB) of at least one input data corresponding to at least one scrambled data having the threshold run length. That is, a modification degree of the input data may be minimized by inverting the LSB.

However, when the input data is within an allowable modification range, the modifier 112 may invert at least one of predetermined bits including at least the LSB of input data. The modifier 112 may invert the LSB and/or a higher bit than the LSB when the number of bits of the input data is greater than that of the threshold run length. For example, when the bits of the input data are 12 bits and the threshold run length is 11 bits, the modifier 112 may invert the LSB of the input data or a bit immediately above the LSB (e.g., LSB+1). For another example, when the bits of the input data are 13 bits and the threshold run length is 11 bits, the modifier 112 may invert the LSB of the input data, the 1-bit upper bit of the LSB (e.g., LSB+1), or a 2-bit upper bit of the LSB (e.g., LSB+2).

That is, the modifier 112 may invert at least one of the bits of input data related to the threshold run length when the run length of the scrambled data meets or exceeds the threshold run length. In this way, the run length of the scrambled data may be maintained at the maximum run length.

In an embodiment, the modifier 112 may compensate for other input data to prevent information distortion caused by the inverting of the at least one bit of the input data. For example, the other input data may be positioned adjacent to the input data having at least one inverted bit. For another example, the other input data may be input data of a next period that corresponds to the input data having at least one inverted bit when the plurality of input data is periodically updated in a predetermined period unit.

In an embodiment, the modifier 112 may perform the compensation by offsetting a difference caused by the inverted bits. For example, the other input data may have a comparably reduced value when the input data has an increased value due to the at least one inverted bit (e.g., LSB). Alternatively or additionally, the other input data may have a comparably increased value when the input data has a reduced value due to the at least one inverted bit (e.g., LSB).

The scrambler 113 may generate the scrambled data by combining the input data and/or the modified input data that is transmitted from the modifier 112 with scrambling information. The transmitter circuit 110, according to an embodiment, may use scrambling as a method of coding the input data. Data scrambled by the scrambler 113 may be an example of coded input data, and may be referred to as the scrambled data in present disclosure. In an embodiment, the scrambler 113 may include a linear feedback shift register (LFSR) (not shown), and generate the scrambled data by performing an exclusive OR (XOR) operation on the scrambling information generated from the LFSR. For example, the scrambling information generated from the LFSR may be based on pseudo-random data and the input data. Alternatively or additionally, the scrambler 113 may replace the corresponding scrambling information with a specific pattern when a run length of the scrambling information meets or exceeds the threshold run length of the input data.

In an embodiment, the input data may be modified into irregular data by the scrambler 113, thus reducing electromagnetic interference (EMI) occurring when the modified data is transmitted from the transmitter circuit 110 to the receiver circuit 120.

Hereinafter, the input data may be divided into predetermined unit bits, and the divided input data may be referred to as unit input data. The scrambled data may also be divided into predetermined unit bits based on the number of bits of the unit input data, and the divided scrambled data may be referred to as unit scrambled data. Hereinafter, the input data may indicate the unit input data, and the scramble data may indicate the unit scramble data.

The serializer 114 may serialize the scrambled data obtained from the scrambler 113 in a time axis direction, generate a data packet with at least a portion of the serialized scrambled data, and transmit the serialized scrambled data to the transmitter TX 116.

The transmitter TX 116 may transmit the data packet to the receiver circuit 120 through the transmission channel 130. In an embodiment, the transmitter TX 116 may modify the data packet into a transmission signal TS based on a characteristic of the transmission channel 130, and provide the transmission signal TS to the transmission channel 130. For example, the transmission channel 130 may include two signal lines for transmitting differential pair signals, and the transmitter TX 116 may generate the transmission signal TS by modifying the data packet into a differential pair signal.

The receiver circuit 120 may include a receiver RX 121, a deserializer 122, a de-scrambler 123, and a clock data recovery (CDR) circuit 124.

The receiver RX 121 may generate the data packet based on the transmission signal TS received from the transmission channel 130. The transmission signal TS may be the differential pair signal, and the receiver RX 121 may modify the differential pair signal into serial digital data included in the data packet.

The CDR circuit 124 may generate a reception clock signal RCLK based on the data packet. For example, the CDR circuit 124 may control a phase locked loop (PLL) (not shown) and/or a delay locked loop (DLL) (not shown) based on transition information included in the data packet to generate the reception clock signal RCLK.

The deserializer 122 may convert the data packet with the serial structure to be parallelized in synchronization with the reception clock signal in the time axis direction, and modify the serial structure data to a parallel structure data. Hereinafter, the modified data may be referred to as the scrambled data.

The de-scrambler 123 may restore the input data by combining descrambling information with the scrambled data. For example, the de-scrambler 123 may include an LFSR and restore the input data by performing an exclusive OR (XOR) operation on the descrambling information generated from the LFSR. For example, the descrambling information generated from the LFSR may be based on pseudo-random data and the scrambled data. The scrambled data may be decoded as the input data when there is a correlation between the scrambling operation performed by the transmitter circuit 110 and the descrambling operation performed by the receiver circuit 120. Accordingly, the LFSR of the scrambler 113 may be the same as the LFSR of the descrambler 123.

The number and arrangement of components of the interface circuit 100 shown in FIG. 1 are provided as an example. In practice, there may be additional components, fewer components, different components, or differently arranged components than those shown in FIG. 1. Furthermore, two or more components shown in FIG. 1 may be implemented within a single component, or a single component shown in FIG. 1 may be implemented as multiple, distributed components. Alternatively or additionally, a set of (one or more) components shown in FIG. 1 may be integrated with each other and implemented as a circuit, as software, and/or as a combination of circuits and software. For example, one or more components of the interface circuit 100 depicted in FIG. 1 may comprise a combination of logic circuitry (e.g., AND gates, NAND gates, NOT gates, OR gates, XOR gates, flip-flops, comparators, multiplexers, latches, registers, counters, and the like) and/or software to implement the functionality described above.

Although not shown in the drawings including FIG. 1, each of the transmitter circuit 110 and the receiver circuit 120 may include at least one processor controlling the components shown in the drawings, or each of these components may include at least one processor performing corresponding functions described herein. The at least one processor may be a microprocessor or include a central processing unit (CPU) and/or graphic processing unit (GPU) embodied as various numbers of hardware or circuit elements, software and/or firmware structures that execute the corresponding functions.

In an embodiment, the interface circuit 100 shown in FIG. 1 may be applied between a host device that generates an image signal and a timing controller that controls a display device. Alternatively or additionally, the interface circuit 100 may be applied between the timing controller and a display driving circuit (and/or a display driving an integrated circuit (IC), referred to herein as "DDI"). Hereinafter, a display device including the timing controller and the DDI are described with reference to FIG. 2.

Figure 2:
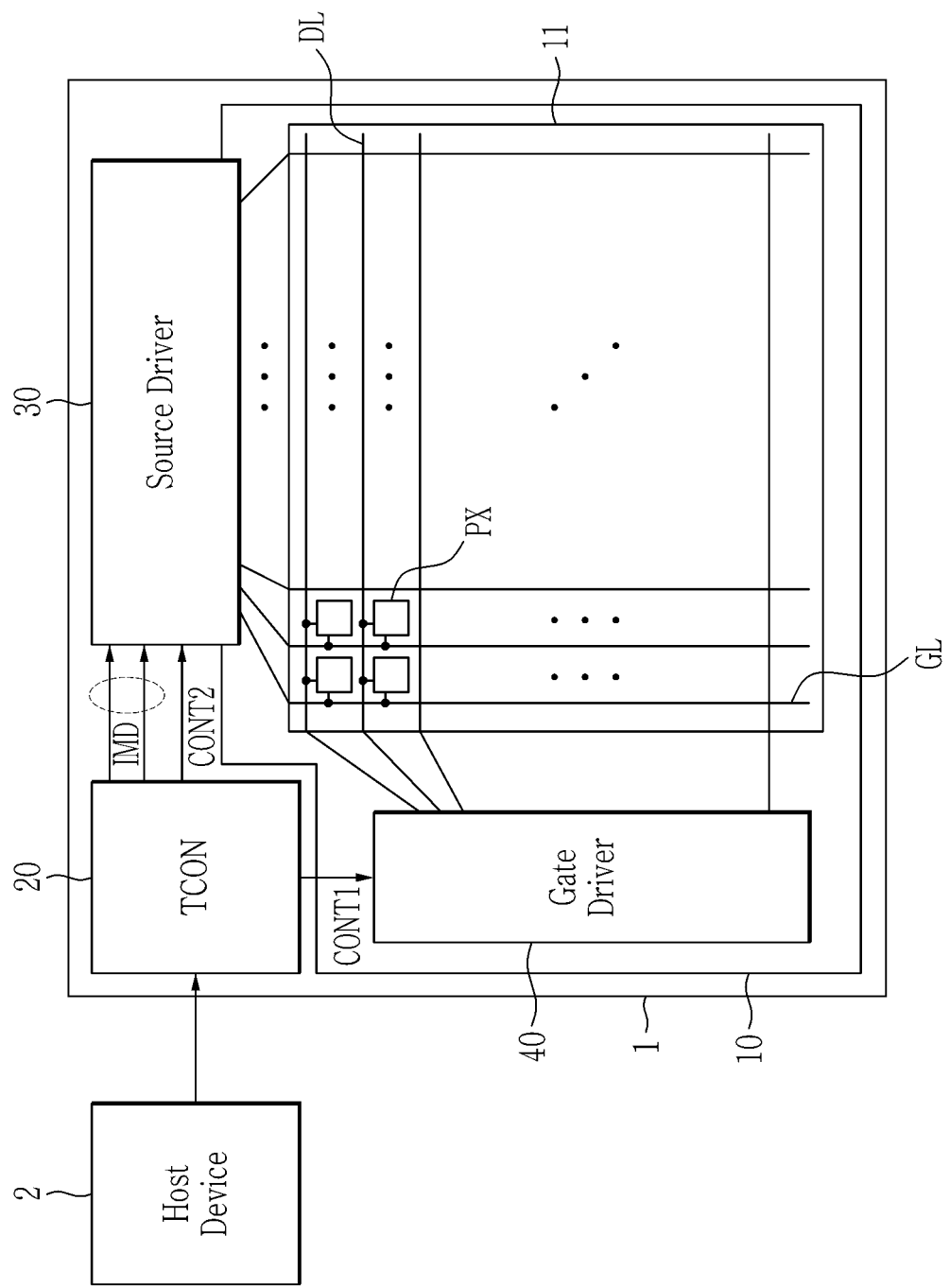
FIG. 2 is a view showing a display device, according to an embodiment.

FIG. 2 is a view showing a display device, according to an embodiment.

A display device 1, according to an embodiment, may be applied to, but not limited to, a liquid crystal display (LCD), an organic light emitting display (OLED), or the like. In an embodiment, the timing controller (TCON) 20 may transmit an image data signal to a source driver 30 (and/or a source driver IC, referred to herein as "SDIC") through an intra-panel interface. The intra-panel interface may implement one or more signaling standards, that may include, but not be limited to, a mini low-voltage differential signaling (mini-LVDS), a reduced swing differential signaling (RSDS), a point-to-point differential signaling (PPDS), an advanced intra-panel interface (AiPi), and an advanced point-to-point mini-LVDS (A-PPmL).

As shown in FIG. 2, the display device 1 may include a display panel 10, a timing controller TCON 20, a source driver 30, and a gate driver 40. In an embodiment, the source driver 30 and the gate driver 40 may be co-located in a display driving IC (DDI).

The timing controller TCON 20 may include a transmitter circuit (e.g., the transmitter circuit 110 of FIG. 1) and the source driver 30 may include a receiver circuit (e.g., the receiver circuit 120 of FIG. 1), according to an embodiment.

For convenience of illustration and description, FIG. 2 shows one timing controller TCON 20 and one source driver 30. However, the present disclosure is not limited in this regard. For example, the source driver 30 may be implemented as the plurality of source driver ICs, and/or the timing controller TCON 20 may be connected (e.g., coupled) to the plurality of source driver ICs in a point-to-point manner (e.g., through the interface circuit 100 of FIG. 1), and transmit data packets including image data signals IMD to the plurality of source driver ICs.

The display device 1 may include a host device 2, or the display device 1 and the host device 2 may be implemented as separate devices coupled with each other through an interface, as shown in FIG. 2. The host device 2 may generate an image signal and/or a control signal to provide to the display device 1. The image signal may be a signal indicating an image to be displayed by the display device 1, and the control signal may include, but not be limited to, a vertical sync signal, a horizontal sync signal, a data enable signal, and/or a main clock signal. That is, the control signal may be necessary for the display device 1 to display the image signal. Alternatively or additionally, the control signal may further include a compensation signal indicating compensation information necessary to perform gamma compensation for the image signal. In an embodiment, the host device 2 may be, but not be limited to, a set-top box, computer, or the like. Alternatively or additionally, the host device 2 may include, but not be limited to, a graphic processing unit (GPU), a visual processing unit (VPU), or the like. The host device 2 may modify an image source into an image signal suitable for the display device 1.

The display panel 10 may include a display 11 on which an image is displayed. The display 11 may include a plurality of data lines DL, a plurality of gate lines GL, and a plurality of pixels PX. The plurality of data lines DL may be arranged in a first direction. The plurality of gate lines GL may be arranged in a second direction crossing the first direction. The plurality of pixels PX may be arranged in a matrix type, and each pixel PX may be connected to the corresponding data lines and the corresponding gate lines. Each pixel PX of the plurality of pixels PX may include a red (R) sub-pixel, a green (G) sub-pixel, and a blue (B) sub-pixel. Alternatively or additionally, each pixel PX of the plurality of pixels PX may include a white (W) sub-pixel. Each pixel PX of the plurality of pixels PX may store a data signal supplied to that pixel through the data line DL synchronized with and connected to a gate signal supplied to that pixel through the connected gate line GL, and emit light in a gray scale based on the data signal. The pixel PX may include an OLED or an LCD, as a light emitting device. However, the present disclosure is not limited in this regard. That is, the pixel PX may include other devices as light emitted devices, such as, but not limited to, polymer light emitting diodes (PLEDs), electroluminescence (EL) lamps, and the like.

The timing controller TCON 20 may receive the image signal and/or the control signal from the host device 2, scramble and modulate the image signal to generate the image data signal IMD, and generate timing control signals for controlling operation timings of the source driver 30 and the gate driver 40 based on the control signal. The timing control signals may include a gate timing control signal CONT1 for controlling the operation timing of the gate driver 40, and a source timing control signal CONT2 for controlling the operation timing of the source driver 30.

For convenience of illustration and description, FIG. 2 shows the timing control signals being directly transmitted from the timing controller TCON 20 to the source driver 30 and the gate driver 40. However, the present disclosure is not limited thereto. For example, timing control signals (e.g., source timing control signal CONT2) transmitted from the timing controller TCON 20 to the source driver 30 may be restored by the source driver 30 through an interface device (e.g., interface circuit 100 of FIG. 1). Alternatively or additionally, the gate timing control signal CONT1 may be included among the restored timing control signals may be transmitted, by the source driver 30, to the gate driver 40.

In an embodiment, the timing controller TCON 20 and the source driver 30 may be coupled with each other through the interface circuit 100 (not shown), using the coding method described with reference to FIG. 1. Alternatively or additionally, the image data signal IMD may be transmitted from the timing controller TCON 20 to the source driver 30 through a plurality of transmission channels (e.g., transmission channel 130 of FIG. 1). That is, the timing controller TCON 20 may transmit, to the source driver 30, data packets including the image data signal IMD processed by the coding method, as described above with reference to FIG. 1, based on scrambling and maintenance of a maximum run length through the transmission channel 130.

The data packets may include a horizontal blank period and/or a vertical blank period. In an embodiment, at least one of the horizontal blank period and the vertical blank period may include a clock training pattern (CTP). The clock training pattern CTP may include a transition pattern for restoring clock information.

The source driver 30 may receive a data packet through the transmission channel 130, track the transition pattern of the data packet to restore the clock information, and parallelize and descramble the data packet based on the clock information to decode image data, as described above with reference to FIG. 1.

The source driver 30 may modify the image data signal IMD into a plurality of data signals based on the source timing control signal CONT2, and supply the plurality of data signals to the plurality of data lines DL. Each of the plurality of data signals may be an analog voltage.

The gate driver 40 may sequentially supply the plurality of gate lines GL with the plurality of gate signals. Alternatively or additionally, the gate driver 40 may supply the plurality of gate lines GL with the plurality of gate signals in a non-sequential manner. The plurality of gate signals may have on-levels (e.g., active levels) for predetermined time periods based on the gate timing control signal CONT1, for example. The plurality of data signals may be supplied through the plurality of data lines DL to the plurality of pixels PX. The plurality of data signals may be written to (e.g., stored in) the plurality of pixels PX when a switching transistor of the plurality of pixels PX is turned on. The switching transistor may be connected to the corresponding gate line GL based on an on-level pulse of the gate signal GL.

A timing when the source driver 30 supplies the plurality of data signals to the plurality of data lines DL and a timing when the gate driver 40 supplies the gate signals with the on-level to each of the plurality of gate lines GL may be synchronized with each other by the gate timing control signal CONT1 and the source timing control signal CONT2.

Figure 3:
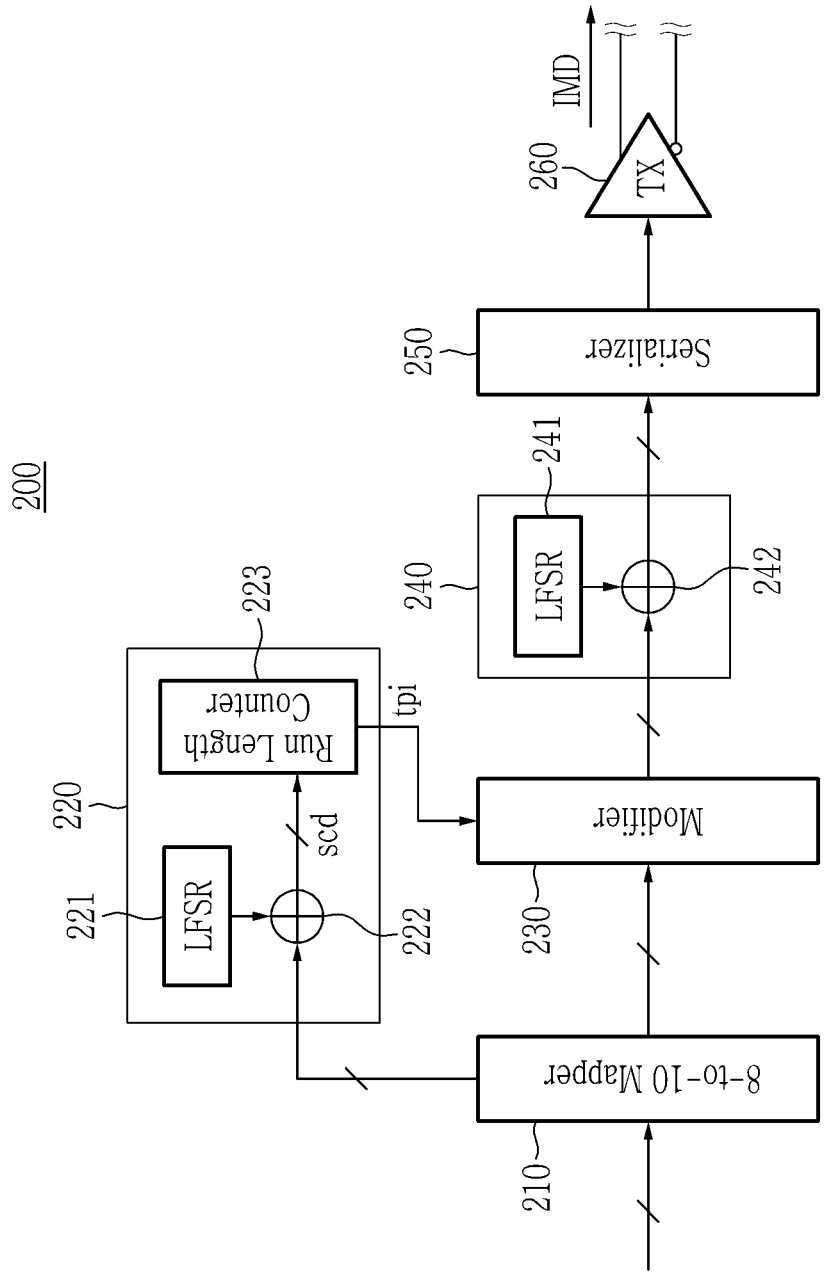
FIG. 3 is a view schematically showing a transmitter circuit of an interface device applied to a timing controller, according to an embodiment.

FIG. 3 is a view schematically showing a transmitter circuit of an interface device applied to the timing controller, according to an embodiment.

In an embodiment, the timing controller TCON 20 of FIG. 2 may include a transmitter circuit 200 as shown in FIG. 3. The transmitter circuit 200 of FIG. 3 may include or may be similar in many respects to the transmitter circuit 110 described above with reference to FIG. 1 and may include additional features not mentioned above.

As shown in FIG. 3, the transmitter circuit 200 may include an 8-to-10 mapper 210, a run length detector 220, a modifier (or pixel modifier) 230, a scrambler 240, a serializer 250, and a transmitter TX 260. The run length detector 220 may include a LFSR 221, an XOR operator 222, and a run length counter 223. The scrambler 240 may include a LFSR 241 and an XOR operator 242.

The number and arrangement of components of the transmitter circuit 200 shown in FIG. 3 are provided as an example. In practice, there may be additional components, fewer components, different components, or differently arranged components than those shown in FIG. 3. Furthermore, two or more components shown in FIG. 3 may be implemented within a single component, or a single component shown in FIG. 3 may be implemented as multiple, distributed components. Alternatively or additionally, a set of (one or more) components shown in FIG. 3 may be integrated with each other and implemented as a circuit, as software, and/or as a combination of circuits and software.

In the following description, the pixel data may be included in the image signal transmitted from the host device 2 to the timing controller 30. The pixel data may refer to the image data in a plurality of bit units that indicate a gray scale of the corresponding sub-pixel. The pixel data may be an example of the input data described in an embodiment of FIG. 1.

The transmitter circuit 200 may generate the scrambled data by scrambling the pixel data (e.g., the input data) with the scrambling information, and modifying (e.g., inverting) the LSB of the pixel data corresponding to the scrambled data having the threshold run length when the run length of the scrambled data meets or exceeds the threshold run length.

The 8-to-10 mapper 210 may modify the pixel data that may utilize eight (8) bit units to indicate a gray scale of a pixel into modified pixel data that may utilize 10 bit units to indicate the gray scale of the pixel. A method by which the 8-to-10 mapper 210 modifies the 8-bit pixel data into the 10-bit data may be implemented using various techniques. That is, the present disclosure is not limited in this regard. For example, the 8-to-10 mapper 210 may generate the 10-bit data by modifying lower 5-bit data of the 8-bit pixel data to 6-bit data and modifying upper 3-bit data of the 8-bit pixel data to 4-bit data. That is, the 8-to-10 mapper 210 may use a 5-bit/6-bit modification table and a 3-bit/4-bit modification table to modify the pixel data. In an embodiment, the 8-bit pixel data may be modified to the 10-bit pixel data to possibly achieve a direct current (DC) balance and/or a bounded disparity of a signal (e.g., scrambled data) transmitted from the timing controller TCON 20 to the source driver 30.

As shown in FIG. 3, the LFSR (e.g., at least one of LFSR 221 and LFSR 241) may generate an input calculated using a linear function of a current state value at a predetermined interval, and generate a next state value as an output based on the generated input. For example, the linear function may include an exclusive OR (XOR). In an embodiment, a seed, which may refer to an initial bit value of the LFSR (e.g., LFSR 221 or LFSR 241), may be predetermined. Alternatively or additionally, a bit (e.g., tap) position affecting a next state in the LFSR (e.g., LFSR 221 or LFSR 241) may be appropriately set based on a design of the LFSR. The number of bits supplied from the LFSR (e.g., LFSR 221 or LFSR 241) to the XOR operator (e.g., XOR operator 222 or XOR operator 242) may be based on the number of bits of the pixel data (e.g., 10 bits). In an embodiments, the output stream of the LFSR (e.g., LFSR 221 or LFSR 241) may comprise pixel data using at least 10 bits. Alternatively or additionally, some bits among the plurality of bits included in the output stream may be used as the scrambling information.

The XOR operator 222 may generate scrambled data scd by performing an exclusive OR operation on the bit units of the 10-bit pixel data output from the 8-to-10 mapper 210 and the 10-bit scrambling information output from the LFSR 221. Table 1 shows an example of the scrambled data scd generated based on the 10-bit pixel data and the 10-bit scrambling information. Each of PD0 to PD9 in Table 1 indicates each position of the 10 bits (e.g., [0:9]) in the pixel data.

In an embodiment, when pixel data and scrambling information are 10 bits, the scrambled data is defined by 10 bits. When a threshold run length is 11 bits, the number of scrambled data of a 10-bits unit, which the threshold run length consists of, may be two. Therefore, the number of target pixel data of 10 bits may also be two and the target pixel data including an LSB among the two target pixel data may be one. The run length counter 223 may transmit, to the modifier 230, the TPI on the target pixel data and/or the pixel

TABLE 1

| Bit Position | Scrambled Data scd | | | | | | | | | |
|---|---|---|---|---|---|---|---|---|---|---|
| | PD0 | PD1 | PD2 | PD3 | PD4 | PD5 | PD6 | PD7 | PD8 | PD9 |
| Pixel Data | 0 | 1 | 0 | 0 | 0 | 1 | 1 | 0 | 1 | 1 |
| Scrambling Information | 0 | 0 | 0 | 1 | 0 | 1 | 0 | 1 | 0 | 1 |
| Scrambled Data | 0 | 1 | 0 | 1 | 0 | 0 | 1 | 1 | 1 | 0 |

The XOR operator 222 may generate the scrambled data scd by performing the exclusive OR (XOR) operation on the pixel data and the scrambling information in a predetermined time unit (hereinafter, referred to as a scrambling period). In an embodiment, the scrambling period may be determined based on the transmission clock signal TCLK generated by the PLL circuit 115 of FIG. 1. For example, the XOR operator 222 may operate in synchronization with the transmission clock signal TCLK and/or a clock signal having an integer multiple period of the transmission clock signal TCLK.

The run length counter 223 may count the run length of the scrambled data scd, and may derive information (hereinafter, target pixel information (TPI)) indicating the pixel data (hereinafter, target pixel data) corresponding to the scrambled data having the threshold run length when the counted run length is the threshold run length. The run length counter 223 may transmit the TPI to the modifier 230. The run length counter 223 may count the pixel data, which may be provided to the run length detector 220 in each frame, to identify position information of the input pixel data from the plurality of pixel data included in the corresponding frame to which the input pixel data belongs. The run length counter 223 may generate the TPI indicating the identified position.

Referring to FIG. 2, the image data of one frame unit displayed by the display device 1 may include the plurality of pixel data lines DL corresponding to a plurality of pixel rows, and each of the plurality of pixel data lines DL may include the plurality of pixel data corresponding to the plurality of pixels PX included in the corresponding pixel data line DL. An order in which the plurality of pixel data lines DL are input to the transmitter circuit 200 may follow a scanning order in which the on-level gate signals are supplied to the plurality of gate lines GL in FIG. 2. In one pixel data line DL, an order in which the plurality of pixel data is input to the transmitter circuit 200 may be an order corresponding to that of the plurality of pixels PX arranged on the display 11 of FIG. 2 in a right direction. For example, assuming that the number indicating the pixel is increased on the display 11 in the right direction, the plurality of pixel data may be input to the transmitter circuit 200 in an increasing order of numbers indicating the pixels corresponding to respective pixel data. Each pixel data may indicate one gray scale among the plurality of sub-pixels included in one pixel.

data including the LSB among the target pixel data. In an embodiment, the run length counter 223 transmits, to the modifier 230, the TPI on the pixel data including the LSB among the target pixel data, as described below with reference to FIG. 4.

Figure 4:
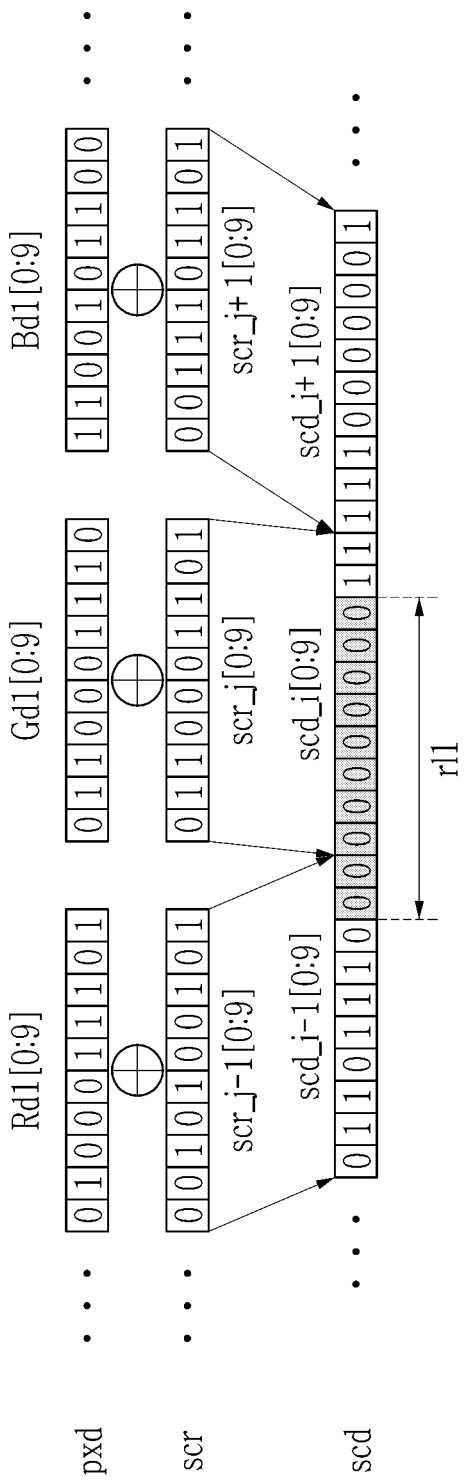
FIG. 4 is a view of an exemplary method in which a run length detector detects a run length, according to an embodiment.

FIG. 4 is a view of an exemplary method in which the run length detector detects the run length, according to an embodiment.

FIG. 4 schematically shows that consecutive pixel data pxd (e.g., Rd1[0:9], Gd1[0:9], and Bd1[0:9]) and scrambling information scr (e.g., scr_j−1[0:9], scr_j[0:9], and scr_j+1[0:9]) corresponding to the pixel data pxd, are exclusive ORed (XORed) to generate scrambled data scd (e.g., scd_i−1[0:9], scd_i[0:9], and scd_i+1[0:9]), where i and j are integers greater than 0. FIG. 4 shows a data structure in which the corresponding data are arranged in one direction for convenience of description. However, the present disclosure is not limited in this regard. For example, the pixel data pxd (e.g., Rd1[0:9], Gd1[0:9], and Bd1[0:9]), the scrambling information scr (e.g., scr_j−1[0:9], scr_j[0:9], and scr_j+1[0:9]), and the scrambled data scd (e.g., scd_i−1[0:9], scd_i[0:9], and scd_i+1[0:9]) may be data having a parallel structure.

As shown in FIG. 4, three (3) bits (e.g., scd_i−1[7:9]) of the scrambled data scd (e.g., scd_i−1[0:9]) and eight (8) bits (e.g., scd_i[0:7]) of the scrambled data scd (e.g., scd_i[0:9]) may have a value of "zero" (e.g. "0"). That is, the identified portion of the scrambled data scd may have a run length rl1 of 11 bits, for example. In such an example, the run length counter 223 may transmit, to the modifier 230, the TPI indicating the target pixel data pxd (e.g., Gd1[0:9]) including the LSB among the two target pixel data pxd (e.g., Rd1[0:9] and Gd1[0:9]) corresponding to the two scrambled data scd (e.g., scd_i−1[0:9] and scd_i[0:9]) of the run length rl1 that meets or exceeds the threshold run length. Alternatively or additionally, the run length counter 223 may transmit, to the modifier 230, the TPI indicating both the target pixel data pxd (e.g., Rd1[0:9] and Gd1[0:9]).

Figure 5:
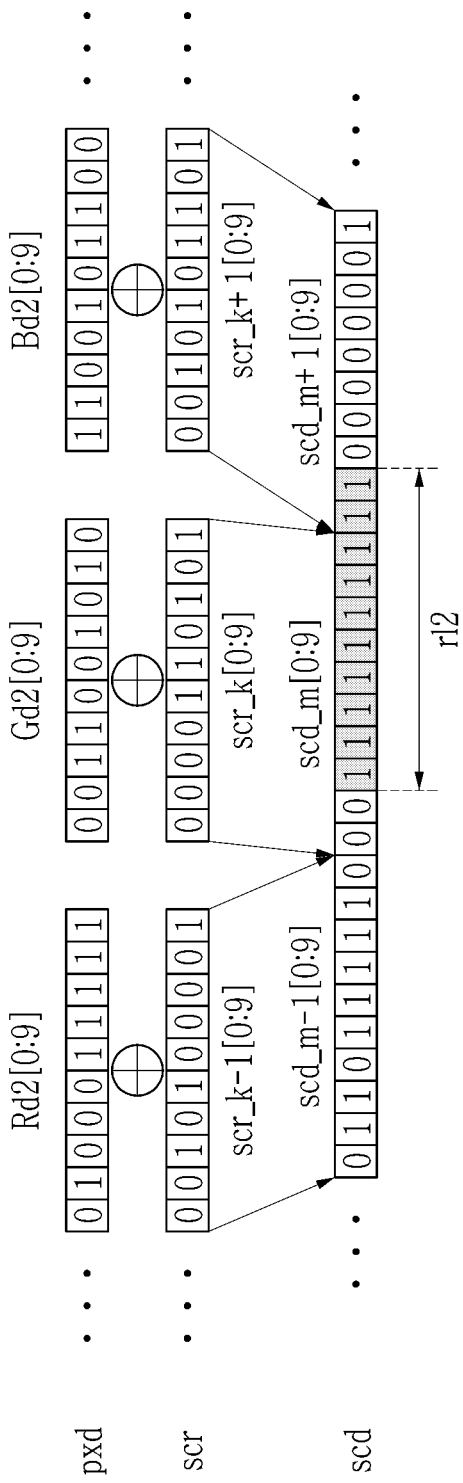
FIG. 5 is a view showing another example for explaining the method in which the run length detector detects the run length, according to an embodiment.

FIG. 5 is a view showing another example for explaining the method in which the run length detector detects the run length, according to an embodiment.

FIG. 5 schematically shows that consecutive pixel data pxd (e.g., Rd2[0:9], Gd2[0:9], and Bd2[0:9]) and scrambling information scd (e.g., scr_k−1[0:9], scr_k[0:9], and scr_k+1[0:9]) corresponding to the pixel data pxd, are exclusive ORed (XORed) to generate scrambled data scd (e.g., scd_m−1[0:9], scd_m[0:9], scd_m+1[0:9]), where k and m are the integers greater than 0.

As shown in FIG. 5, eight (8) bits (e.g., scd_m[2:9]) of the scrambled data scd (e.g., scd_m[0:9]) and three (3) bits (e.g., scd_m+1[0:2]) of the scrambled data scd (e.g., scd_m+1[0:9]) may have a value of "one" (e.g., "1"). That is, the identified portion of the scrambled data scd may have a run length rI2 of 11 bits, for example. In such an example, the run length counter 223 may transmit, to the modifier 230, the TPI indicating the target pixel data pxd (e.g., Bd2[0:9]) including the LSB among the two target pixel data pxd (e.g., Gd2[0:9] and Bd2[0:9]) corresponding to the two scrambled data scd (e.g., scd_m[0:9] and scd_m+1[0:9]) of the run length rI2 that meets or exceeds the threshold run length. Alternatively or additionally, the run length counter 223 may transmit, to the modifier 230, the TPI indicating both the target pixel data pxd (e.g., Gd2[0:9] and Bd2[0:9]).

Referring to FIG. 3, the modifier 230 may generate the modified pixel data by inverting the LSB of the target pixel data based on the TPI received from the run length detector 220 and transmit the modified pixel data to the scrambler 240. Alternatively or additionally, the modifier 230 may transmit, to the scrambler 240, the pixel data generated by the 8-to-10 mapper 210 when the modifier 230 receives no TPI from the run length detector 220. As a result, the modified pixel data and/or the pixel data transmitted to the scrambler 240 may be input to the XOR operator 242 and scrambled with the scrambling information output from the LFSR 241. In an embodiment, the modifier 230 may generate the modified pixel data by detecting the target pixel data including the LSB among the target pixel data and inverting the LSB of the detected target pixel data when receiving, from the run length detector 220, the TPI indicating the target pixel data.

Figures 6, 7:
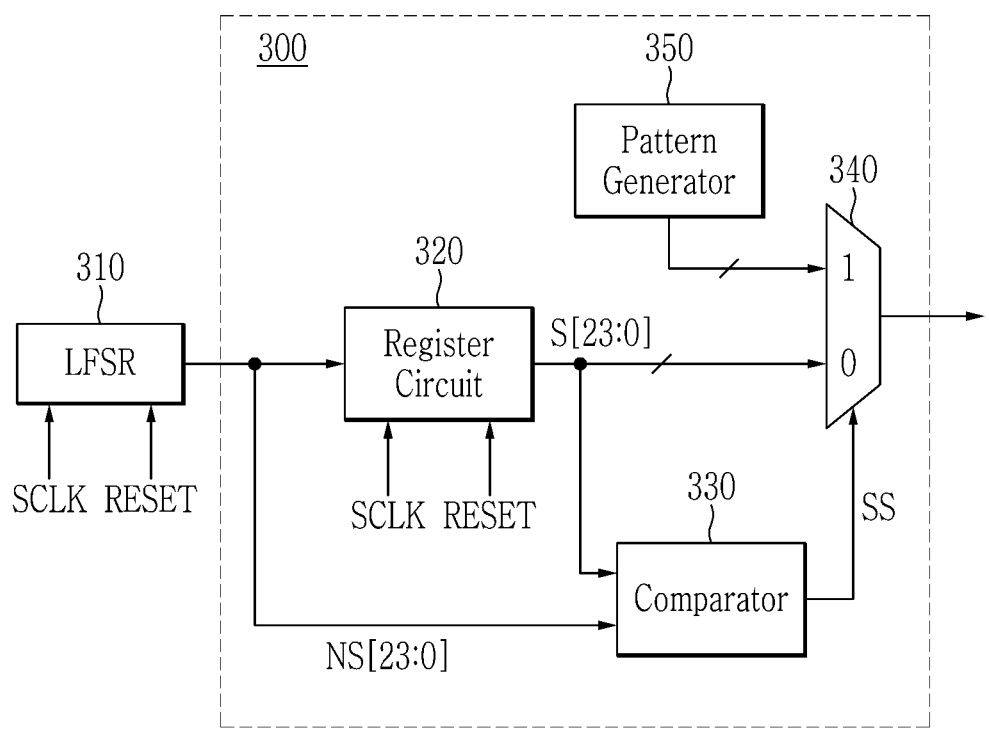
FIG. 6 is a view showing an example of a method in which a modifier inverts a least significant bit (LSB) of target pixel data, according to an embodiment.
FIG. 7 is a view showing a linear feedback shift register (LFSR) modification circuit, according to an embodiment.

FIG. 6 is a view showing an example of a method in which the modifier inverts the least significant bit (LSB) of the target pixel data, according to an embodiment.

FIG. 6 schematically shows the modified pixel data (e.g., Gdm1[0:9] and Bdm2[0:9]) generated by inverting the LSB of the target pixel data (e.g., Gd1[0:9] and Bd2[0:9]) detected in FIGS. 4 and 5.

As shown in FIG. 6, the modifier 230 may invert the LSB of the target pixel data pxd (e.g., Gd1[0:9]) to generate the modified pixel data (e.g., Gdm1[0:9]). For example, the modifier 230 may invert a "zero" (e.g., "0") contained by the LSB of target pixel data pxd (e.g., Gd1[0:9]) to a "one" (e.g., "1") contained by the modified pixel data (e.g., Gdm1[0:9]).

Alternatively or additionally, the modifier 230 may invert the LSB of the target pixel data pxd (e.g., Bd2[0:9]) to generate the modified pixel data (e.g., Bdm2[0:9]). For example, the modifier 230 may invert a "one" (e.g., "1") contained by the LSB of target pixel data pxd (e.g., Bd2[0:9]) to a "zero" (e.g., "0") contained by the modified pixel data (e.g., Bdm2[0:9]).

Referring to FIG. 3, the XOR operator 242 may generate the scrambled data by performing the exclusive OR (XOR) operation on the pixel data supplied from the modifier 230 and the scrambling information output from the LFSR 241. The pixel data supplied from the modifier 230 may be the pixel data generated by the 8-to-10 mapper 210 and/or the modified pixel data generated by the modifier 230.

The serializer 250 may serialize the scrambled data supplied from the XOR operator 242 in the time axis direction. The image data signal serialized by the serializer 250 may be transmitted to the source driver 30 through the transmitter 260.

As described above, the maximum run length of the scrambled data may be maintained by inverting the LSB of the target pixel data when the threshold run length is detected. That is, it may be possible to additionally control the run length of the scrambling information to be the same as the maximum run length of the pixel data. Alternatively or additionally, it may also be possible to arbitrarily control a LFSR reset period for resetting the output stream of the LFSR. The LSFR reset period may be reset as a different period for each frame of the display device. The reset may allow the LFSR to start its operation with a different seed value.

FIG. 7 is a view showing a linear feedback shift register (LFSR) modification circuit, according to an embodiment.

The LFSR modification circuit 300 shown in FIG. 7 may replace the scrambling information with a specific pattern when the run length of the scrambling information generated from the LFSR 310 meets or exceeds the threshold run length. The maximum run length of the scrambling information may be determined based on the maximum run length of the pixel data. For example, the maximum run length and the threshold run length of the scrambling information may be the same as the maximum run length and the threshold run length of the pixel data.

The number and arrangement of components of the LFSR modification circuit 300 shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Alternatively or additionally, a set of (one or more) components shown in FIG. 7 may be integrated with each other, and/or may be integrated with the LFSR 310 and implemented as an integrated circuit, as software, and/or a combination of circuits and software.

As shown in FIG. 7, the LFSR modification circuit 300 may include a register circuit 320, a comparator 330, a multiplexer 340, and a pattern generator 350, and receive the output stream from the LFSR 310.

The LFSR modification circuit 300 of FIG. 3 may include or may be similar in many respects to at least one of the LFSR 221 and the LFSR 241 described above with reference to FIG. 3 and may include additional features not mentioned above. As such, the LFSR modification circuit 300 shown in FIG. 7 may be applied to the LFSR 221 and/or to the LFSR 241 of FIG. 3. Accordingly, the run length detector 220 and/or the scrambler 240 of FIG. 3 may further include the LFSR modification circuit 300.

As described above with reference to FIG. 3, the LFSR 310 may generate the input calculated using the linear function (e.g., XOR) of the current state value at the predetermined interval, and generate the next state value as the output based on the generated input. The LFSR 310 may include a plurality of registers and at least one XOR operator. The seed, which may be the initial bit value of the LFSR 310, may be predetermined, and changed whenever the LFSR 310 is reset. Bits (e.g., taps) affecting the output of the LFSR 310 may be XOR-operated and input to the register corresponding to the tap. The LFSR 310 may input the plurality of inputs generated based on the clock signal SCLK corresponding to the predetermined interval to the corresponding register among the plurality of registers. The LFSR 310 may output, as the scrambling information, the output stream including the bits whose number is determined based on a design (e.g., the number of bits of the pixel data) among outputs of the plurality of registers. The clock signal SCLK may be the same as the transmission clock signal TCLK, and/or may be generated by dividing the transmission clock signal TCLK. As shown in FIG. 7, the register circuit 320 may store a current output stream S[23:0], and the LFSR 310 may generate a next output stream NS[23:0].

Figure 8:
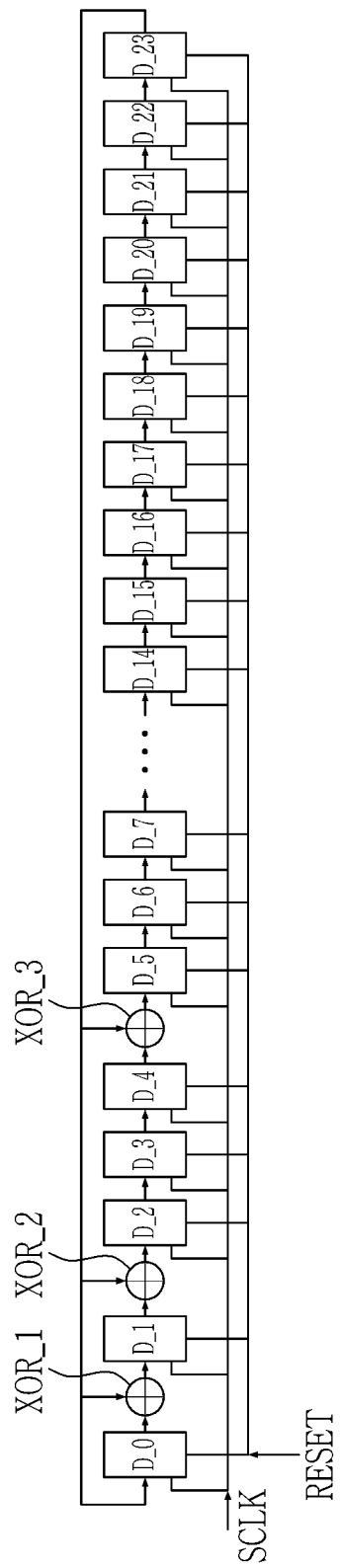
FIG. 8 is a view showing an example configuration of a LFSR, according to an embodiment.

FIG. 8 is a view showing an example configuration of the LFSR, according to an embodiment.

As shown in FIG. 8, the LFSR 310 may include 24 D-flip-flops (e.g., D_0 to D_23) and three XOR operators (e.g., XOR_1 to XOR_3). The LFSR 310 may be implemented using the polynomial $x^{24}+x^5+x^2+x+1$ representing a characteristic of the LFSR 310. However, the present disclosure is not limited in this regard. For example, the LFSR 310 may include a different quantity or type of flip-flops, a different quantity or type of operators, and/or may be implemented using a different polynomial without deviating from the scope of the present disclosure.

Each of the plurality of D-flip-flops D_0 to D_23 may be synchronized with the clock signal SCLK (e.g., synchronized with a rising edge). That is, the plurality of D-flip-flops may be provided with the clock signal SCLK as an input to a clock terminal of each D-flip-flop of the plurality of D-flip-flops. Each of the plurality of D-flip-flops D_0 to D_23 may output a signal that may be provided as input to an input terminal of a subsequent D-flip-flop. For example, the output of D-flip-flop D_2 may be provided as input to D-flip-flop D_3.

The scrambling information may include bits tailored to the number of bits of the pixel data among the output streams (e.g., S[23:0] and NS[23:0] of FIG. 7) of the LFSR 310, sequentially generated through the plurality of D-flip-flops D_0 to D_23. For example, when the pixel data is configured to use 10 bits, the scrambling information may be the output streams (S[23:14] and NS[23:14]) of the plurality of D-flip-flops D_14 to D_23 among the plurality of D-flip-flops D_0 to D_23.

In an embodiment, the XOR operator XOR_1 may be positioned between the D-flip-flop D_0 and the D-flip-flop D_1, and perform an XOR operation with an output of the D-flip-flop D_23 and an output of D-flip-flop D_0 to transmit the output of the XOR operation as an input of the D-flip-flop D_1, according to the polynomial characterizing the LFSR 310. Alternatively or additionally, the XOR operator XOR_2 may be positioned between the D-flip-flop D_1 and the D-flip-flop D_2, and perform an XOR operation with the output of the D-flip-flop D_23 and an output of D-flip-flop D_1 to transmit the output of the XOR operation as an input of the D-flip-flop D_2, according to the polynomial characterizing the LFSR 310. Alternatively or additionally, the XOR operator XOR_3 may be positioned between the D-flip-flop D_4 and the D-flip-flop D_5, and perform an XOR operation with the output of the D-flip-flop D_23 and an output of D-flip-flop D_4 to transmit the output of the XOR operation as an input of the D-flip-flop D_5, according to the polynomial characterizing the LFSR 310.

For every period of the clock signal SCLK, each of the plurality of D-flip-flops D_0 to D_23 may determine its corresponding output based on the provided input, which may be the output of a previous D-flip-flop and/or the output of an XOR gate (e.g., XOR_1 to XOR_3). The plurality of D-flip-flops (e.g., D_0 to D_23) may output the current output stream S[23:0]. At a subsequent period of the clock signal SCLK, S[0], which may refer to the last bit of the current output stream S[23:0], may be fed back to the plurality of D-flip-flops D_0 to D_23, and for every subsequent period of the clock signal SCLK, each of the plurality of D-flip-flops may determine its corresponding output based on the provided input, which may be the output of a previous D-flip-flop and/or the output of an XOR gate (e.g., XOR_1 to XOR_3), and the plurality of D-flip-flops D_0 to D_23 may output the next output stream NS[23:0]. As shown in FIG. 8, the output stream may comprise 24 bits based on the number of the plurality of D flip-flops D_0 to D_23, for example. However, the present disclosure is not limited in this regard. The output stream may comprise a different number of bits and/or of flip-flops without deviating from the scope of the present disclosure.

Continuing to refer to FIG. 8, a reset signal RESET may be input to a reset terminal of each of the plurality of D-flip-flops D_0 to D_23. Each of the plurality of D-flip-flops D_0 to D_23 may be reset based on an enable level of the reset signal RESET. When the plurality of D-flip-flops D_0 to D_23 are reset, the seed value, which may refer to an initial value for each of a plurality of D-flip-flops D-1 to D_24, may be changed. In an embodiment, the scrambler 240 of FIG. 3 may generate the reset signal RESET for resetting the output stream of the LFSR 310, and/or may control a generation period of the reset signal RESET. For example, the generation period of the reset signal RESET may be changed for every frame of the display device 1.

Referring to FIG. 7, the register circuit 320 may store the output stream generated by the LFSR 310 at a corresponding address. For example, the register circuit 320 may include a plurality of registers for storing the plurality of bits, and may store, in the register at the corresponding address, each of the plurality of bits included in the output stream of the LFSR 310 based on the clock signal SCLK that may also be used to synchronize with the operation period of the LFSR 310. The plurality of bits stored in the register circuit 320 may be reset by the reset signal RESET. Each bit included in the next output stream NS[23:0] may be stored in the corresponding register in a state where the current output stream S[23:0] is stored in the register circuit 320.

The comparator 330 may determine whether bits of an address corresponding to the scrambling information among the current output stream S[23:0] stored in the register circuit 320 and the next output stream NS[23:0] generated by the LFSR 310 have the same value. In order to control the run length of the scrambling information so as not to exceed the maximum run length of the input data, the comparator 330 may compare whether values of consecutive bits included in the scrambling information are the same as each other.

FIG. 9 is a view schematically showing a method in which the comparator compares the scrambling information, according to an embodiment.

FIG. 9 shows a plurality of steps in which the comparator 330 compares the bits of the address corresponding to the scrambling information among the current output stream S[23:0] and the next output stream NS[23:0]. Each bit of NS[23:14] of the next output stream may be generated at each step (e.g., steps #1 to #10), and the comparator 330 may compare and determine whether the bits corresponding to the scrambling information have the same value, among S[23:14] of the current output stream and NS[23:14] of the next output stream, in each step of steps #1 to #10. In an embodiment, the comparator 330 may compare consecutive 11-bit values among the scrambling information to maintain the maximum run length of the scrambling information as 10 bits identically to that of the pixel data.

For example, the comparator 330 may compare bit values of S[23:14] of the current output stream S[23:0] with bit values of NS[23] of the next output stream NS[23:0] in step

1. In step #2, the comparator 330 may compare bit values of S[22:14] of the current output stream S[23:0] with bit values of NS[23:22] of the next output stream NS[23:0]. The comparator 330 may compare bit values of S[21:14] of the current output stream S[23:0] with bit values of NS[23:21] of the next output stream NS[23:0] in step #3. In step #4, the comparator 330 may compare bit values of S[20:14] of the current output stream S[23:0] with bit values of NS[23:20] of the next output stream NS[23:0]. The comparator 330 may compare bit values of S[19:14] of the current output stream S[23:0] with bit values of NS[23:19] of the next output stream NS[23:0] in step #5. In step #6, the comparator 330 may compare bit values of S[18:14] of the current output stream S[23:0] with bit values of NS[23:18] of the next output stream NS[23:0]. The comparator 330 may compare bit values of S[17:14] of the current output stream S[23:0] with bit values of NS[23:17] of the next output stream NS[23:0] in step #7. In step #8, the comparator 330 may compare bit values of S[16:14] of the current output stream S[23:0] with bit values of NS[23:16] of the next output stream NS[23:0]. The comparator 330 may compare bit values of S[15:14] of the current output stream S[23:0] with bit values of NS[23:15] of the next output stream NS[23:0] in step #9. In step #10, the comparator 330 may compare bit values of S[14] of the current output stream S[23:0] with bit values of NS[23:14] of the next output stream NS[23:0].

In an embodiment, when the number of the consecutive bits having the same value among the scrambling information meets or exceeds the threshold run length, the comparator 330 may transmit a selection signal SS indicating this state to the multiplexer 340.

The multiplexer 340 may transmit, to the XOR operator (e.g., XOR operator 222 or XOR operator 242 of FIG. 3), the bits S[23:14] corresponding to the scrambling information among the current output stream S[23:0] stored in the register circuit 320 based on the selection signal SS input from the comparator 330. Alternatively or additionally, the multiplexer 340 may transmit, to the XOR operator (e.g., XOR operator 222 or XOR operator 242 of FIG. 3), the scrambling information having the specific pattern from the pattern generator 350. For example, the comparator 330 may generate the selection signal SS of a logic level "zero" (e.g., "0") when the number of bits consecutively having the same value among the scrambling information is less than the threshold run length. For another example, the comparator 330 may generate the selection signal SS of a logic level "one" (e.g., "1") when the number of bits consecutively having the same value among the scrambling information meets or exceeds the threshold run length.

In an embodiment, the multiplexer 340 may transmit, to the XOR operator (e.g., XOR operator 222 or XOR operator 242 of FIG. 3), S[23:14] of the current output stream S[23:0] stored in the register circuit 320 as the scrambling information when the selection signal SS has the logic level "zero" (e.g., "0").

Alternatively or additionally, the multiplexer 340 may transmit, to the XOR operator (e.g., XOR operator 222 or XOR operator 242 of FIG. 3), the output stream of the specific pattern that is supplied from the pattern generator 350 (e.g., toggle data instead of the current output stream S[23:0] stored in the register circuit 320) as the scrambling information when the selection signal SS has the logic level "one" (e.g., "1").

In an embodiment, the multiplexer 340 may transmit the scrambling information to the XOR operator (e.g., XOR operator 222 or XOR operator 242 of FIG. 3) at a timing after a check for the run length of the current output stream S[23:0] and the next output stream NS[23:0] has been performed. That is, the current output stream buffered by the multiplexer 340 may be output, or the specific pattern supplied from the pattern generator 350 may be output based on the logical level of the selection signal SS generated at the timing when the bits of S[23:14] of the current output stream S[23:0] have been buffered by the multiplexer 340, and the check for the run length of the current output stream and that of the next output stream has been completed by the comparator 330.

The pattern generator 350 may generate the output stream of the specific pattern. For example, the pattern generator 350 may generate toggling bit data, such as, but not limited to, "101010 . . . ", as the output stream.

FIG. 10 is a view showing a method in which the LFSR modification circuit modifies the scrambling information, according to an embodiment.

FIG. 11 is a view showing another method in which the LFSR modification circuit modifies the scrambling information, according to an embodiment.

Figure 12:
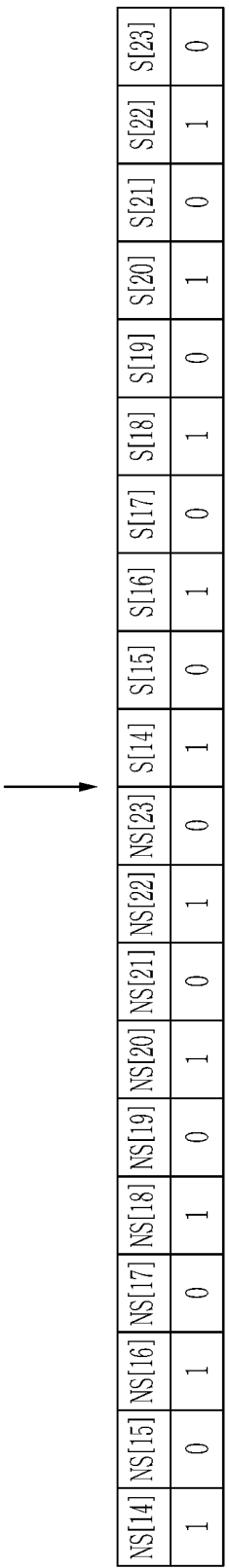
FIG. 12 is a view showing another method in which the LFSR modification circuit modifies the scrambling information, according to an embodiment.

FIG. 12 is a view showing another method in which the LFSR modification circuit modifies the scrambling information, according to an embodiment.

In describing an embodiment with reference to FIGS. 10 to 12, the description is provided by assuming that the bit values of S[21:14] of the current output stream and the bit values of NS[23:21] of the next output stream have the same value of "zero" in the comparison step #3 shown in FIG. 9.

As shown in FIG. 10, the comparator 330 may transmit the selection signal SS of the logic level "one" to the multiplexer 340 in a period while S[23:14] of the current output stream S[23:0] is output as the scrambling information. As shown in FIG. 10, the multiplexer 340 may then output the specific pattern of "1010101010" instead of S[23:14] of the current output stream S[23:0].

As shown in FIG. 11, the comparator 330 may transmit the selection signal SS of the logic level "one" to the multiplexer 340 in a period while NS[23:14] of the next output stream NS[23:0] is output as the scrambling information. As shown in FIG. 11, the multiplexer 340 may then output the specific pattern of "1010101010" instead of NS[23:14] of the next output stream NS[23:0].

As shown in FIG. 12, the comparator 330 may transmit the selection signal SS of the logic level "one" to the multiplexer 340 in a period while S[23:14] of the current output stream S[23:0] and NS[23:14] of the next output stream NS[23:0] are output as the scrambling information. As shown in FIG. 12, the multiplexer 340 may then output the specific pattern of "1010101010" instead of S[23:14] of the current output stream S[23:0] and the specific pattern of "1010101010" instead of NS[23:14] of the next output stream NS[23:0].

Figure 13:
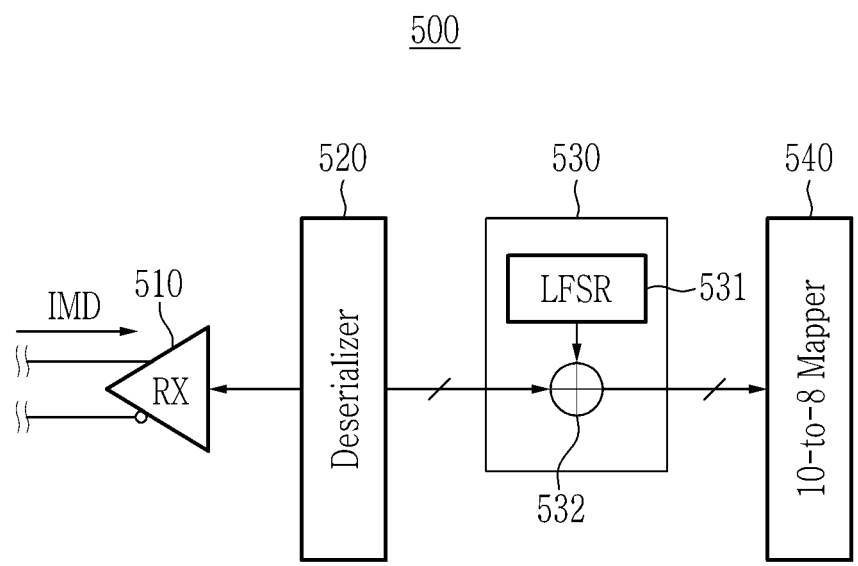
FIG. 13 is a view showing a receiver circuit of a source driver, according to an embodiment.

FIG. 13 is a view showing a receiver circuit of a source driver, according to an embodiment.

As shown in FIG. 13, a receiver circuit 500 of a source driver 30 may include a receiver RX 510, a deserializer 520, a de-scrambler 530, and a 10-to-8 mapper 540.

The receiver 510 may receive the image data signal IMD from the transmitter circuit 200 of the timing controller TCON 20 and generate the data packet based on the image data signal IMD. The image data signal IMD may be a differential pair signal, and the receiver RX 121 may modify the differential pair signal into the serial digital data included in the data packet.

The deserializer 520 may parallelize the data packet of the serial structure in the time axis direction and modify the parallelized data packet to scrambled data having parallel structure.

The de-scrambler 530 may restore the image data by combining the descrambling information with the scrambled data. For example, the de-scrambler 530 may include a LFSR 531 and an XOR operator 532. The LFSR 531 of FIG. 13 may include or may be similar in many respects to at least one of the LFSR 221 and the LFSR 241 described above with reference to FIG. 3 and the LFSR 310 described above with reference to FIG. 7, and may include additional features not mentioned above.

The XOR operator 532 may restore the image data by performing the exclusive OR (XOR) operation on the descrambling information and the scrambled data provided from the LFSR 531.

The 10-to-8 mapper 540 may modify the 10-bit pixel data to the 8-bit pixel data in the image data. A method in which the 10-to-8 mapper 540 modifies the 10-bit pixel data to the 8-bit pixel data may be implemented using various techniques. That is, the present disclosure is not limited in this regard. In an embodiment, the 10-to-8 mapper 540 may modify the pixel data by using a reverse of the modification method of the 8-to-10 mapper 210 of the transmitter circuit 200 of FIG. 3. That is, the 10-to-8 mapper 540 may generate the 8-bit pixel data by modifying lower 6-bit data of the 10-bit pixel data to 5-bit data and modifying upper 4-bit data of the 10-bit pixel data to 3-bit data.

In an embodiment of the present disclosure, the LSB of the pixel data may be inverted to maintain the maximum run length. However, an inverted LSB may result in a distorted image that a user may recognize when provided by the display device 1. As such, in order to prevent the apparently distorted image, aspects of the present disclosure provide for compensation (e.g., spatial compensation) of the pixel data of the same sub-pixel in another pixel adjacent to the pixel including the sub-pixel corresponding to the LSB-inverted pixel data (hereinafter, referred to as the LSB-inverted sub-pixel). Alternatively or additionally, aspects of the present disclosure provide for compensation (e.g., temporal compensation) of the pixel data of the LSB-inverted sub-pixel in the next frame of a frame to which the LSB-inverted pixel data belongs.

A transmitter circuit that compensates for the pixel data of another pixel adjacent to the LSB-inverted pixel, according to an embodiment, is described below with reference to FIG. 14.

Figure 14:
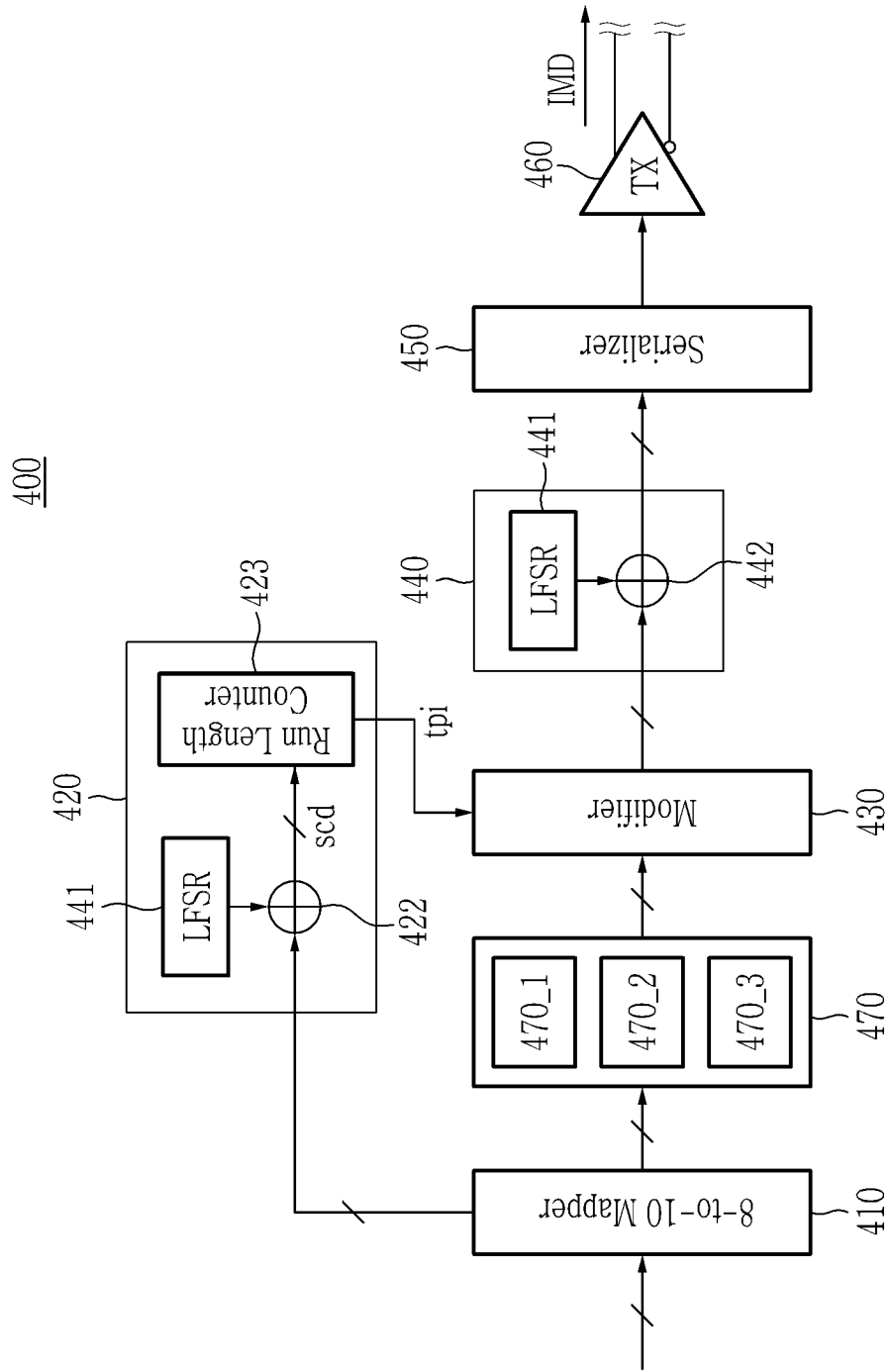
FIG. 14 is a view showing the transmitter circuit, according to an embodiment.

FIG. 14 is a view showing the transmitter circuit, according to an embodiment.

As shown in FIG. 14, a transmitter circuit 400 may include an 8-to-10 mapper 410, a run length detector 420, a modifier (or pixel modifier) 430, a scrambler 440, a serializer 450, and a transmitter TX 460. The run length detector 420 may include a LFSR 421, an XOR operator 422, and a run length counter 423. The scrambler 440 may include a LFSR 441 and an XOR operator 442.

The architecture of the transmitter circuit 400 depicted in FIG. 14 is similar in many respects to the architecture of the transmitter circuit 200 described above with reference to FIG. 3 and may include additional features not mentioned above. For example, the transmitter circuit 400 may further include a data buffer 470 when compared to the transmitter circuit 200. The remaining components of the transmitter circuit 400 may include or may be similar in many respects to their corresponding components described above with reference to FIG. 3, unless otherwise indicated by the following description. Repeated descriptions of components and/or features described above with reference to FIG. 3 may be omitted for the sake of brevity and simplicity.

The data buffer 470 may store pixel data of a reference pixel and that of the adjacent pixel based on the pixel (e.g., reference pixel) corresponding to the pixel data whose run length is monitored. For example, multiple pixel data of a plurality of sub-pixels including pixels positioned at positions Ni, Ni−1, and Ni+1 may be stored in the data buffer 470 when the reference pixel is a pixel positioned at a Ni+1 position on display 11, where i is an integer greater than 0.

The data buffer 470 may include three data buffer regions (e.g., 470_1 to 470_3). The data buffer region 470_1 may store multiple pixel data of a plurality of sub-pixels included in a pixel positioned to the left (e.g., Ni−1) based on the reference pixel (e.g., Ni). The data buffer region 470_2 may store multiple pixel data of a plurality of sub-pixels included in the reference pixel (e.g., Ni). The data buffer region 470_3 may store multiple pixel data of a plurality of sub-pixels included in a pixel positioned to the right (e.g., Ni+1) based on the reference pixel (e.g., Ni). That is, the data buffer 470 may store pixel data of a target sub-pixel to be compensated for.

As described above with reference to FIG. 3, the modifier 430 of FIG. 14 may receive the TPI corresponding to the scrambled data having the threshold run length from the run length detector 420, and may invert the LSB of the target pixel data. Alternatively or additionally, the modifier 430 may compensate for the pixel data corresponding to the target sub-pixel to be compensated for that is adjacent to a sub-pixel corresponding to the target pixel data. In an embodiment, the target sub-pixel to be compensated for may be a sub-pixel of the same color as the sub-pixel corresponding to the target pixel data.

Figure 15:
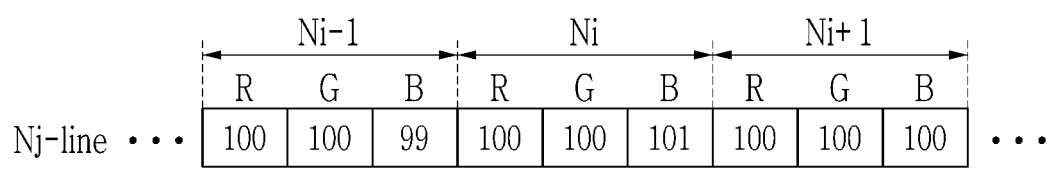
FIG. 15 is a view showing a method of compensating for pixel data of a target sub-pixel to be compensated for, according to an embodiment.

FIG. 15 is a view showing a method of compensating for the pixel data of the target sub-pixel to be compensated for, according to an embodiment.

FIG. 15 shows pixel data that is to be compensated for in one line (e.g., Nj) of the plurality of pixel lines included in the display 11. For example, the pixel data corresponding to the B sub-pixel of the Ni−1-th pixel among the plurality of pixels included in the pixel line Nj and the pixel data corresponding to the R sub-pixel of the Ni-th pixel each have the target pixel data having (e.g., meeting or exceeding) the threshold run length. For convenience of description, it may be assumed that pixel data "100" corresponds to each sub-pixel shown in FIG. 15.

In an embodiment, the modifier 430 may invert the LSB of the pixel data corresponding to the B sub-pixel included in the Ni−1-th pixel. For example, when the LSB is inverted from "one" to "zero," "99" may be a modified pixel data of the B sub-pixel included in the Ni−1-th pixel. Alternatively or additionally, the modifier 430 may modify, to "101," the pixel data corresponding to the target sub-pixel to be compensated for included in the Ni-th pixel adjacent to the Ni−1-th pixel. A human eye may perceive an average value of a gray scale of sub-pixels spatially adjacent to each other, and thus recognize an average value of a gray scale of the LSB-inverted sub-pixel and a compensated gray scale of the target sub-pixel to be compensated for. As a result, the user may not recognize the distortion occurring due to the inverted LSB.

Figure 16:
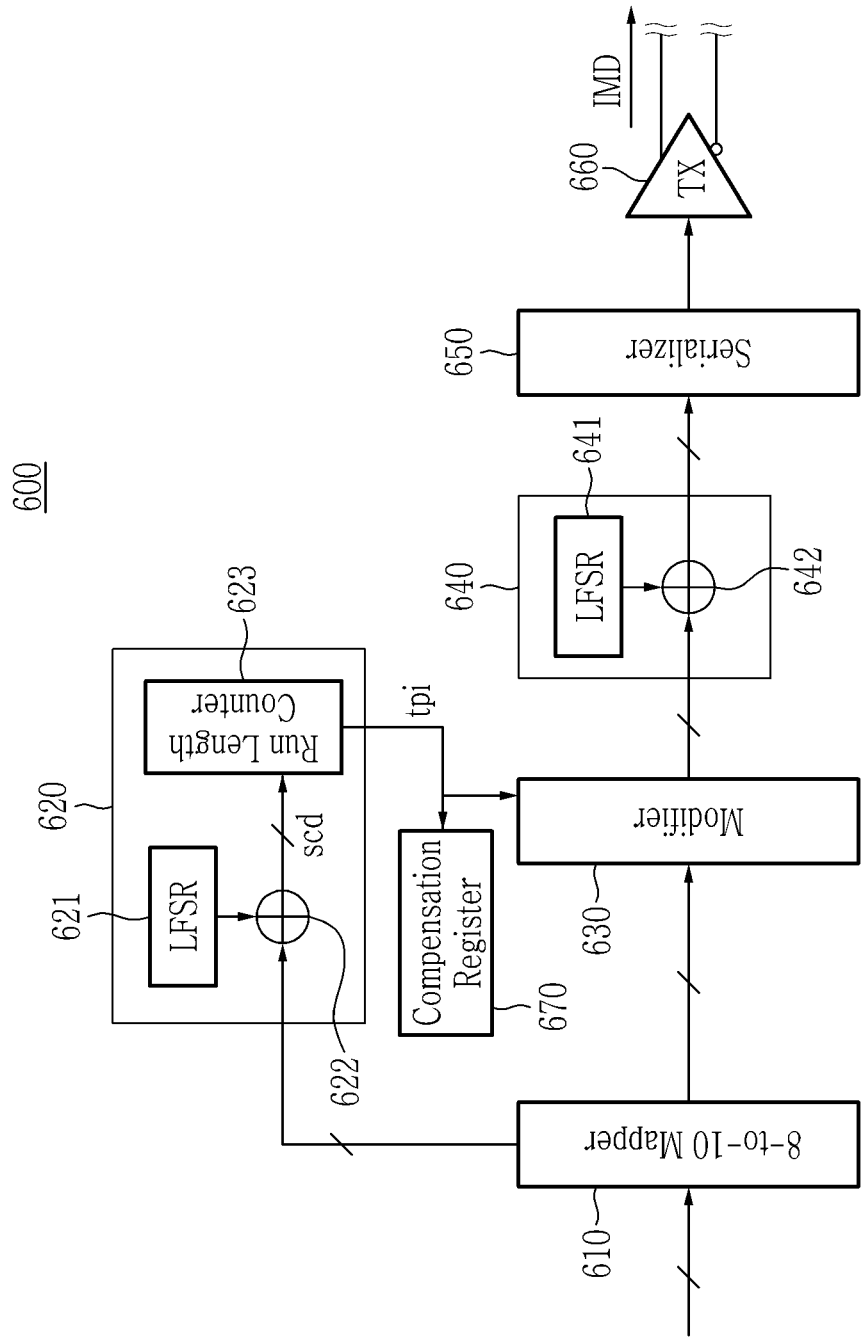
FIG. 16 is a view showing another transmitter circuit, according to an embodiment.

FIG. 16 is a view showing another transmitter circuit, according to an embodiment.

As shown in FIG. 16, a transmitter circuit 600 may include an 8-to-10 mapper 610, a run length detector 620, a modifier (or pixel modifier) 630, a scrambler 640, a serializer 650, and a transmitter TX 660. The run length detector 620 may include a LFSR 621, an XOR operator 622, and a run length counter 623. The scrambler 660 may include a LFSR 641 and an XOR operator 642.

The architecture of the transmitter circuit 600 depicted in FIG. 16 is similar in many respects to the architecture of the transmitter circuit 200 described above with reference to FIG. 3 and/or the transmitter circuit 400 described above with reference to FIG. 14, and may include additional features not mentioned above. For example, the transmitter circuit 600 may further include a compensation register 670 when compared to the transmitter circuit 200 and/or to the transmitter circuit 400. The remaining components of the transmitter circuit 600 may include or may be similar in many respects to their corresponding components described above with reference to FIGS. 3 and 14, unless otherwise indicated by the following description. Repeated descriptions of components and/or features described above with reference to FIGS. 3 and 14 may be omitted for the sake of brevity and simplicity.

The number and arrangement of components of the transmitter circuit 600 shown in FIG. 16 are provided as an example. In practice, there may be additional components, fewer components, different components, or differently arranged components than those shown in FIG. 16. Furthermore, two or more components shown in FIG. 16 may be implemented within a single component, or a single component shown in FIG. 16 may be implemented as multiple, distributed components. Alternatively or additionally, a set of (one or more) components shown in FIG. 16 may be integrated with each other. For example, the modifier 630 may include (and/or be integrated with) the compensation register 670.

As described above with reference to FIGS. 3 and 14, the modifier 630 may receive the TPI corresponding to the scrambled data having the threshold run length from the run length detector 620, and invert the LSB of the target pixel data.

The compensation register 670 may receive the TPI from at least one of the run length detector 620 and the modifier 630.

The modifier 630 may compensate for the pixel data (hereinafter, target pixel data to be compensated for) corresponding to the TPI among the plurality of pixel data in the next frame following the frame to which the target pixel data belongs. The modifier 630 may reset the TPI stored in the compensation register 670 after compensating for the target pixel data to be compensated for.

Figure 17:
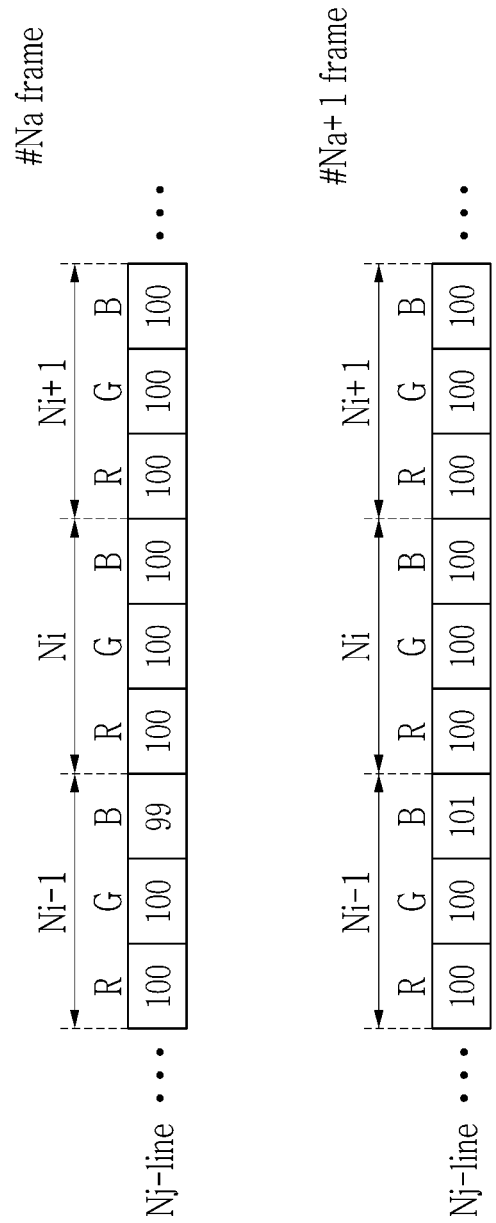
FIG. 17 is a view showing another method of compensating for target pixel data to be compensated for, according to an embodiment.

FIG. 17 is a view showing another method of compensating for target pixel data to be compensated for, according to an embodiment.

FIG. 17 shows pixel data in a Na+1-th frame that is to be compensated for in a pixel line (e.g., Nj) of the plurality of pixel lines included in a Na-th frame displayed by the display 11. For example, pixel data corresponding to the B sub-pixel of the Ni−1-th pixel among the plurality of pixels included in the pixel line Nj and the pixel data corresponding to the R sub-pixel of the Ni-th pixel each may have the target pixel data having (e.g., meeting or exceeding) the threshold run length. For convenience of description, it may be assumed that the pixel data "100" corresponds to each sub-pixel shown in FIG. 17.

In the Na-th frame, the modifier 630 may invert the LSB of the pixel data corresponding to the B sub-pixel included in the Ni−1-th pixel. For example, when the LSB is inverted from "one" to "zero," "99" may be a modified pixel data of the B sub-pixel included in the Ni−1-th pixel. In the Na+1-th frame, the modifier 630 may modify, to "101," the target pixel data to be compensated for corresponding to the B sub-pixel included in the Ni-th pixel. A human eye may perceive an average value of a gray scale of sub-pixels temporally consecutive to each other, and thus recognize an average value of a gray scale of the LSB-inverted sub-pixel and a compensated gray scale of the target sub-pixel to be compensated for. As a result, the user may not recognize the distortion occurring due to the inverted LSB.

Figure 18:
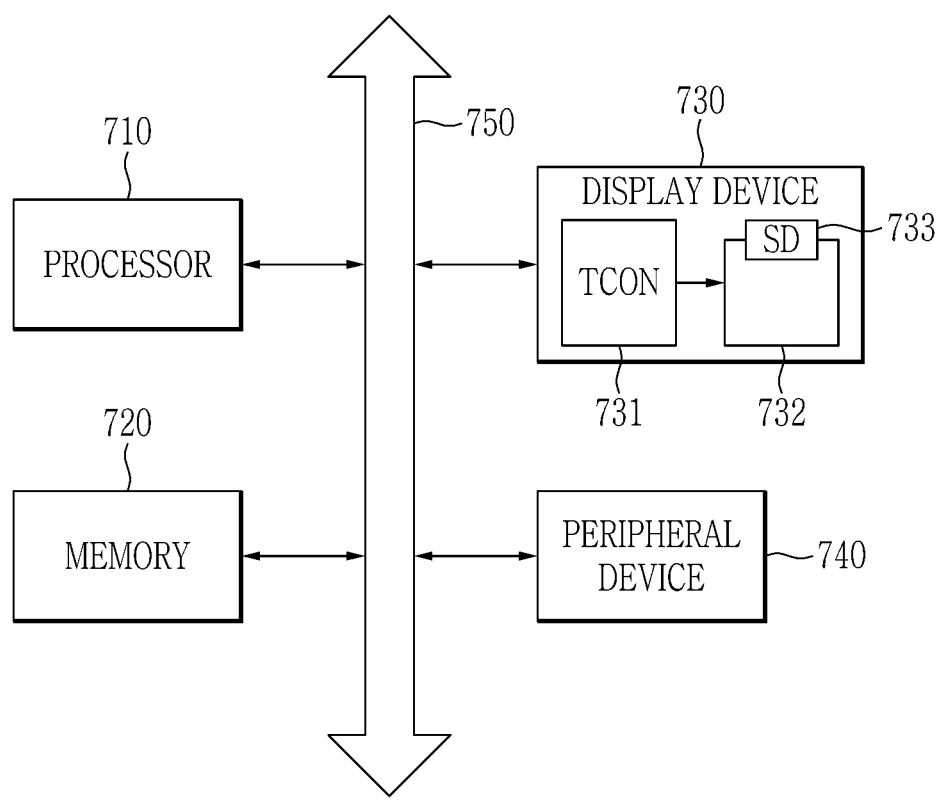
FIG. 18 is a view for describing a semiconductor system, according to an embodiment.

FIG. 18 is a view for describing a semiconductor system, according to an embodiment.

Referring to FIG. 18, a semiconductor system 700, according to an embodiment, may include a processor 710, a memory 720, a display device 730, and a peripheral device 740, electrically connected (e.g., coupled) to a system bus 750.

The processor 710 may control input/output of data between the memory 720, the display device 730, and the peripheral device 740, and perform image processing on an image signal transmitted between the corresponding devices.

The memory 720 may include a volatile memory, such as but not limited to, a random access memory (RAM) and a dynamic RAM (DRAM), and/or a non-volatile memory, such as but not limited to, a flash memory. The memory 720 may include, but not be limited to, a DRAM, a phase-change RAM (PRAM), a magnetic RAM (MRAM), a resistive RAM (ReRAM), a ferroelectric RAM (FRAM), a NOR flash memory, a NAND flash memory, a fusion flash memory (e.g., a memory in which a static RAM (SRAM) buffer, the NAND flash memory, and a NOR interface logic are combined with one another), or the like. The memory 720 may store the image signal obtained from the peripheral device 740 and/or the image signal processed by the processor 710.

The display device 730 may include a timing controller TCON 731 and a display panel 732. The display device 730 may store the image signal supplied through the system bus 750 in a frame memory included in the timing controller TCON 731 to display the image signal on the display panel 732. The interface circuit, according to an embodiment described above, may be applied between the timing controller TCON 731 and a source driver SD 733.

The peripheral device 740 may be a device that modifies a video and/or a still image into an electrical signal, such as but not limited to, a camera, a scanner, and a webcam. The image signal obtained by the peripheral device 740 may be stored in the memory 720 and/or processed by the processor 710 in real time and supplied to the display device 730.

The semiconductor system 700 may be included in a mobile electronic product such as a smartphone, a tablet, a wearable device, and the like, but is not limited thereto, and may be included in various types of electronic products that display images.

As such, according to the present disclosure, it may be possible to maintain the maximum run length of the data transmitted from the transmitter circuit to the receiver circuit. Accordingly, the overhead for maintaining the maximum run length may not be necessary in coding the channel for the data transmission and reception. Alternatively or additionally, the transmitter circuit may perform only the modification operation of inverting the specific bits of the data to be transmitted, and the modifier may thus be easily implemented in hardware or software.

While this disclosure has been described in connection with what is presently considered to be practical exemplary embodiments, it is to be understood that the present disclosure is not limited to the disclosed embodiments. On the contrary, it is intended to cover various modifications and equivalent arrangements included within the spirit and scope of the appended claims.

What is claimed is:

1. A transmitter circuit, comprising:
a run length detector configured to derive position information indicating first input data related to a threshold run length from among a plurality of input data in a predetermined bit unit, when a run length of first scrambled data for the first input data meets or exceeds the threshold run length in the predetermined bit unit;
a modifier configured to generate modified input data by inverting at least one bit of the first input data based on the position information; and
a scrambler configured to:
receive the modified input data from the modifier; and
generate second scrambled data by scrambling the modified input data with scrambling information.

2. The transmitter circuit of claim 1, wherein the modifier is further configured to invert a least significant bit (LSB) of the first input data.

3. The transmitter circuit of claim 2, wherein the modifier is further configured to compensate for second input data of the plurality of input data positioned adjacent to the modified input data in the predetermined bit unit.

4. The transmitter circuit of claim 2, wherein the modifier is further configured to:
when the plurality of input data in the predetermined bit unit is periodically updated in a predetermined period unit, compensate for next input data of a next period that corresponds to the modified input data.

5. The transmitter circuit of claim 1, wherein the scrambler is further configured to replace the scrambling information with a predetermined pattern when a run length of the scrambling information meets or exceeds the threshold run length.

6. The transmitter circuit of claim 1, wherein:
the plurality of input data in the predetermined bit unit comprise pixel data indicating a gray scale, and
the position information indicating the first input data related to the threshold run length comprises target pixel information (TPI) indicating target pixel data related to the threshold run length.

7. The transmitter circuit of claim 6, wherein the run length detector further comprises:
a linear feedback shift register (LFSR) configured to generate first scrambling information;
an exclusive OR (XOR) gate configured to generate the first scrambled data by scrambling the first scrambling information with the pixel data; and
a run length counter configured to:
count the run length of the first scrambled data; and
derive the TPI indicating the target pixel data when the run length of the first scrambled data meets or exceeds the threshold run length.

8. The transmitter circuit of claim 7, wherein the run length counter is further configured to:
count the pixel data to identify a position of the target pixel data from at least a portion of the pixel data comprised in a frame to which the target pixel data belongs; and
generate the TPI indicating the identified position of the target pixel data.

9. The transmitter circuit of claim 6, wherein the modifier is further configured to generate modified pixel data by inverting a least significant bit (LSB) of the target pixel data.

10. The transmitter circuit of claim 6, wherein the modifier is further configured to compensate for pixel data corresponding to a target sub-pixel to be compensated for that is adjacent to a sub-pixel corresponding to the target pixel data by offsetting a change in the target pixel data, and
wherein the target sub-pixel to be compensated for has a same color as the sub-pixel corresponding to the target pixel data.

11. The transmitter circuit of claim 10, further comprising:
a data buffer configured to store the pixel data corresponding to the target sub-pixel to be compensated for.

12. The transmitter circuit of claim 6, wherein the modifier is further configured to compensate for next pixel data corresponding to the TPI among a plurality of next pixel data in a next frame following a frame to which the target pixel data belongs by offsetting a change in the target pixel data.

13. The transmitter circuit of claim 6, wherein the scrambler further comprises:
a linear feedback shift register (LFSR) configured to generate second scrambling information;
an exclusive OR (XOR) gate configured to generate the second scrambled data by scrambling the second scrambling information with the pixel data supplied from the modifier; and
an LFSR modification circuit configured to replace the scrambling information with a predetermined pattern when a run length of the second scrambling information meets or exceeds the threshold run length,
wherein the pixel data supplied from the modifier comprises modified pixel data.

14. The transmitter circuit of claim 13, wherein:
a reset period for resetting an output stream generated by the LFSR is changed for every frame, and
the output stream comprises the second scrambling information.

15. The transmitter circuit of claim 13, wherein the LFSR modification circuit comprises:
a comparator configured to determine whether bits of an address corresponding to the second scrambling information among a current output stream and a next output stream of the LFSR have a same value;
a pattern generator configured to generate a predetermined output stream of the predetermined pattern; and
a multiplexer configured to output the bits of the address corresponding to the second scrambling information among the current output stream of the LFSR or the predetermined output stream of the predetermined pattern, under control of the comparator.

16. A display device, comprising:
a display panel comprising a plurality of pixels and a plurality of data lines coupled to the plurality of pixels;
a source driver configured to supply a plurality of data signals to the plurality of data lines based on image data signals; and
a transmitter circuit configured to:
generate modified pixel data by inverting at least one bit of target pixel data corresponding to first scrambled data when a run length of the first scrambled data meets or exceeds a threshold run length, wherein the first scrambled data has been obtained by scrambling pixel data indicating a gray scale;
generate second scrambled data by scrambling the modified pixel data; and
compensate for pixel data corresponding to a target sub-pixel to be compensated for that is adjacent to a sub-pixel corresponding to the target pixel data by offsetting a change in the target pixel data, wherein the target sub-pixel to be compensated for has a same color as the sub-pixel corresponding to the target pixel data, and wherein the image data signals comprise the second scrambled data.

17. The display device of claim 16, wherein the transmitter circuit comprises:

a linear feedback shift register (LFSR) configured to generate second scrambling information;

an exclusive OR (XOR) gate configured to generate the second scrambled data by scrambling the second scrambling information with at least one of the pixel data and the modified pixel data; and a LFSR modification circuit configured to replace the second scrambling information with a predetermined pattern when a run length of the second scrambling information meets or exceeds the threshold run length.

18. The display device of claim 16, wherein the transmitter circuit further comprises:

a data buffer configured to store the pixel data corresponding to the target sub-pixel to be compensated for.

19. A display device, comprising:

a display panel comprising a plurality of pixels and a plurality of data lines coupled to the plurality of pixels;

a source driver configured to supply a plurality of data signals to the plurality of data lines based on image data signals; and a transmitter circuit configured to:

generate modified pixel data by inverting at least one bit of target pixel data corresponding to first scrambled data when a run length of the first scrambled data meets or exceeds a threshold run length, wherein the first scrambled data has been obtained by scrambling pixel data indicating a gray scale;

generate second scrambled data by scrambling the modified pixel data; and compensate for next pixel data corresponding to the target pixel data among a plurality of next pixel data in a next frame following a frame to which the target pixel data belongs by offsetting a change in the target pixel data.

20. The display device of claim 19, wherein the transmitter circuit comprises:

a linear feedback shift register (LFSR) configured to generate first scrambling information;

an exclusive OR (XOR) gate configured to generate the first scrambled data by scrambling the first scrambling information with the pixel data; and a run length counter configured to:

count the run length of the first scrambled data; and derive target pixel information (TPI) indicating the target pixel data when the run length of the first scrambled data meets or exceeds the threshold run length.

* * * * *